US009531494B2

(12) United States Patent
Somasundaram et al.

(10) Patent No.: US 9,531,494 B2
(45) Date of Patent: Dec. 27, 2016

(54) TECHNIQUES FOR ACQUIRING MEASUREMENTS OF A SHARED SPECTRUM AND PERFORMING CHANNEL SELECTION FOR ACCESS POINTS USING THE SHARED SPECTRUM

(71) Applicant: QUALCOMM Incorporated, San Diego, CA (US)

(72) Inventors: Kiran Kumar Somasundaram, San Diego, CA (US); Dexu Lin, San Diego, CA (US); Naga Bhushan, San Diego, CA (US); Aleksandar Damnjanovic, Del Mar, CA (US); Wanshi Chen, San Diego, CA (US); Peter Gaal, San Diego, CA (US); Anastasios Stamoulis, San Diego, CA (US); Gavin Bernard Horn, La Jolla, CA (US); Onkar Dabeer, San Diego, CA (US); Yongbin Wei, La Jolla, CA (US); Durga Prasad Malladi, San Diego, CA (US); Tingfang Ji, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 14/630,216

(22) Filed: Feb. 24, 2015

(65) Prior Publication Data
US 2015/0280847 A1    Oct. 1, 2015

Related U.S. Application Data

(60) Provisional application No. 61/972,028, filed on Mar. 28, 2014.

(51) Int. Cl.
*H04J 11/00*    (2006.01)
*H04L 5/00*    (2006.01)
(Continued)

(52) U.S. Cl.
CPC .............. *H04J 11/0056* (2013.01); *H04L 1/20* (2013.01); *H04L 5/0048* (2013.01); *H04W 72/082* (2013.01)

(58) Field of Classification Search
CPC ................................ H04J 11/0056; H04L 1/20
(Continued)

(56) References Cited

U.S. PATENT DOCUMENTS

| 2013/0208587 A1* | 8/2013 | Bala ...................... H04W 16/14 370/230 |
| 2015/0057011 A1* | 2/2015 | Di Girolamo ........ H04W 16/14 455/454 |

(Continued)

FOREIGN PATENT DOCUMENTS

WO    WO-2012109195 A2    8/2012

OTHER PUBLICATIONS

ISA/EPO, International Search Report and Written Opinion of the International Searching Authority, Int'l Appl. No. PCT/US2015/017416, Jun. 2, 2015, European Patent Office, Rijswijk, NL, 9 pgs.

*Primary Examiner* — Mark Rinehart
*Assistant Examiner* — Peter Solinsky
(74) *Attorney, Agent, or Firm* — Hollard & Hart LLP

(57) ABSTRACT

Techniques are described for wireless communication. A first method may include transmitting a reference signal from an access point over a shared spectrum to a user equipment (UE), and receiving a measurement of the reference signal from the UE. A second method may include receiving at a UE over a shared spectrum a reference signal from an access point, and transmitting a measurement of the reference signal to the access point. In each of the first and second methods, the measurement may indicate interference with the shared spectrum from outside of a clear channel assessment (CCA) range of the access point. A third method
(Continued)

may include receiving a plurality of reference signal measurements, where each reference signal measurement corresponds to one of a plurality of access points and indicates interference with a shared spectrum from outside of a CCA range of the corresponding access point, and performing channel selection for the plurality of access points based at least in part on the received reference signal measurements.

22 Claims, 25 Drawing Sheets

(51) Int. Cl.
  *H04W 72/08* (2009.01)
  *H04L 1/20* (2006.01)
(58) Field of Classification Search
  USPC .......................................................... 370/252
  See application file for complete search history.

(56) References Cited

U.S. PATENT DOCUMENTS

| | | | | |
|---|---|---|---|---|
| 2015/0139175 A1* | 5/2015 | Ratasuk | ................ | H04L 5/0051 |
| | | | | 370/330 |
| 2015/0350949 A1* | 12/2015 | Wang | .................... | H04W 16/14 |
| | | | | 370/230 |
| 2016/0135148 A1* | 5/2016 | Novlan | ..................... | H04L 5/00 |
| | | | | 370/329 |

\* cited by examiner

US 9,531,494 B2

TECHNIQUES FOR ACQUIRING MEASUREMENTS OF A SHARED SPECTRUM AND PERFORMING CHANNEL SELECTION FOR ACCESS POINTS USING THE SHARED SPECTRUM

CROSS REFERENCES

The present Application for Patent claims priority to U.S. Provisional Patent Application No. 61/972,028 by Somasundaram et al., entitled "Techniques For Acquiring Measurements Of A Shared Spectrum And Performing Channel Selection For Access Points Using The Shared Spectrum," filed Mar. 28, 2014, assigned to the assignee hereof, and expressly incorporated by reference herein.

BACKGROUND

Field of the Disclosure

The present disclosure, for example, relates to techniques for acquiring measurements of a shared spectrum and performing channel selection for access points using the shared spectrum.

Description of the Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of access points (e.g., bases stations, eNBs, and/or Wi-Fi access points), each simultaneously supporting communication for multiple UEs. An access point may communicate with UEs on downlink channels (e.g., for transmissions from an access point to a UE) and uplink channels (e.g., for transmissions from a UE to an access point).

Some modes of communication may enable communications with a UE over different radio frequency spectrum (e.g., licensed spectrum and/or shared spectrum). With increasing data traffic in cellular networks, the offloading of at least some data traffic to a shared spectrum may provide a mobile network operator with opportunities for enhanced data transmission capacity. Prior to gaining access to and transmitting data over the shared spectrum, a transmitting apparatus may, in some examples, perform a listen before talk (LBT) procedure to gain access to the shared spectrum. An LBT procedure may include performing a clear channel assessment (CCA) to determine whether a channel of the shared spectrum is available. When it is determined that the channel of the shared spectrum is not available (e.g., because another device is already using the channel of the shared spectrum), a CCA may be performed for the channel again at a later time.

Before performing an LBT procedure to gain access to a channel of a shared spectrum, a transmitting device may need to select the channel from a plurality of channels for communicating over the shared spectrum.

SUMMARY

The present disclosure, for example, relates to one or more techniques for acquiring measurements of a shared spectrum and performing channel selection for access points using the shared spectrum. In some examples, the techniques may include acquiring user equipment (UE) radio resource management (UE-RRM) measurements of a reference signal. The reference signal may in some examples be included in a clear channel assessment (CCA)-exempt transmission (CET) and/or in a CCA frame including the reference signal. When the reference signal is included in a CET, a CCA may be performed prior to transmission of the CET, thereby making the CET listen before talk (LBT)-aware (e.g., the CET including the reference signal may be transmitted with knowledge of whether the reference signal will or will not be subject to interference from other signals). In some examples, the techniques may include performing channel selection based at least in part on the acquired UE-RRM measurements.

In a first set of illustrative examples, a method for wireless communication is described. In one example, the method may include transmitting a reference signal from an access point over a shared spectrum to a UE, and receiving a measurement of the reference signal from the UE. The measurement may indicate interference with the shared spectrum from outside of a CCA sense range of the access point.

In some examples of the method, transmitting the reference signal may include transmitting a CET to the UE over the shared spectrum. The CET may include the reference signal. In these examples, the method may further include performing a CCA for the shared spectrum before transmitting the CET. The CET may include an indication of whether the CCA was successful. The method may further include determining that the measurement of the reference signal indicates the interference with the shared spectrum from outside of the CCA sense (CS) range of the access point when the CCA is successful. In some examples, the measurement of the reference signal may include a Reference Signal Received Power (RSRP) measurement and a Reference Signal Received Quality (RSRQ) measurement, and the method may further include using only the RSRP measurement when the CCA is unsuccessful.

In some examples, the method may include tuning the access point from a first channel within the shared spectrum to a second channel within the shared spectrum, and performing a CCA on the second channel. In some of these examples, transmitting the reference signal may include transmitting the reference signal over the second channel when the CCA is successful. The method may also include signaling a transition to the second channel to the UE prior to transmitting the reference signal over the second channel. The method may also include tuning the access point back to the first channel following the transmission of the reference signal. In some examples, the measurement of the reference signal may be received over one of the first channel or the second channel.

In some examples, the method may include transmitting the measurement of the reference signal to at least one other access point. In some examples, the measurement may be transmitted to the at least one other access point over a backhaul interface. In some examples, the method may further include receiving a channel selection for the access point over a backhaul interface. The channel selection may be based at least in part on the measurement of the reference signal.

In some examples, the method may include performing a channel selection for the access point based at least in part on the measurement of the reference signal.

In a second set of illustrative examples, an apparatus for wireless communication is described. In one example, the apparatus may include means for transmitting a reference signal from an access point over a shared spectrum to a UE, and means for receiving a measurement of the reference signal from the UE. The measurement may indicate interference with the shared spectrum from outside of a CCA sense range of the access point. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor and memory coupled to the processor. The processor may be configured to transmit a reference signal from an access point over a shared spectrum to a UE, and to receive a measurement of the reference signal from the UE. The measurement may indicate interference with the shared spectrum from outside of a CCA sense range of the access point. In some examples, the processor may be configured to implement one or more aspects of the method for wireless communication described above with respect to the first set of illustrative examples.

In a fourth set of illustrative examples, a computer program product for communication by a wireless communication apparatus in a wireless communication system is described. In one configuration, the computer program product may include a non-transitory computer-readable medium storing instructions executable by a processor to cause the wireless communication apparatus to transmit a reference signal from an access point over a shared spectrum to a UE, and to receive a measurement of the reference signal from the UE. The measurement may indicate interference with the shared spectrum from outside of a CCA sense range of the access point. In some examples, the instructions may also be executable by the processor to cause the wireless communication apparatus to implement one or more aspects of the method for wireless communication described above with respect to the first set of illustrative examples.

In a fifth set of illustrative examples, another method for wireless communication is described. In one example, the method may include receiving at a UE over a shared spectrum a reference signal from an access point, and transmitting a measurement of the reference signal to the access point. The measurement may indicate interference with the shared spectrum from outside of a CCA sense range of the access point.

In some examples of the method, receiving the reference signal may include receiving a CET from the access point over the shared spectrum. The CET may include the reference signal. The method may also include determining whether a CCA performed by the access point before transmission of the CET was successful based at least in part on the CET. The measurement of the reference signal may indicate the interference with the shared spectrum from outside of the CS range of the access point when the CCA performed by the access point was successful. In some examples, the measurement of the reference signal may include a RSRP measurement or a RSRQ measurement.

In some examples, the method may include tuning the UE from a first channel within the shared spectrum to a second channel within the shared spectrum, and receiving the reference signal over the second channel. The method may also include receiving signaling indicating a transition to the second channel prior to receiving the reference signal over the second channel. In some examples, tuning the UE to the second channel may occur in response to the signaling. In some examples, the method may also include tuning the UE back to the first channel following the receipt of the reference signal. In some examples, the measurement of the reference signal may be transmitted over one of the first channel or the second channel.

In a sixth set of illustrative examples, another apparatus for wireless communication is described. In one configuration, the apparatus may include means for receiving at a UE over a shared spectrum a reference signal from an access point, and means for transmitting a measurement of the reference signal to the access point. The measurement may indicate interference with the shared spectrum from outside of a CCA sense range of the access point. In some examples, the apparatus may further include means for implementing one or more aspects of the method for wireless communication described above with respect to the fifth set of illustrative examples.

In a seventh set of illustrative examples, another apparatus for wireless communication is described. In one configuration, the apparatus may include a processor memory coupled to the processor. The processor may be configured to receive at a UE over a shared spectrum a reference signal from an access point, and to transmit a measurement of the reference signal to the access point. The measurement may indicate interference with the shared spectrum from outside of a CCA sense range of the access point. In some examples, the processor may be configured to implement one or more aspects of the method for wireless communication described above with respect to the fifth set of illustrative examples.

In an eighth set of illustrative examples, another computer program product for communication by a wireless communication apparatus in a wireless communication system is described. The computer program product may include a non-transitory computer-readable medium storing instructions executable by a processor to cause the wireless communication apparatus to receive at a UE over a shared spectrum a reference signal from an access point, and to transmit a measurement of the reference signal to the access point. The measurement may indicate interference with the shared spectrum from outside of a CCA sense range of the access point. In some examples, the instructions may also be executable by the processor to cause the wireless communication apparatus to implement one or more aspects of the method for wireless communication described above with respect to the fifth set of illustrative examples.

In a ninth set of illustrative examples, another method for wireless communication is described. In one example, the method may include receiving a plurality of reference signal measurements. Each reference signal measurement may correspond to one of a plurality of access points and indicate interference with a shared spectrum from outside of a CCA sense range of the corresponding access point. The method may also include performing channel selection for the plurality of access points based at least in part on the received reference signal measurements.

In some examples, the method may include identifying at least one pair of access points, from the plurality of access points, such that the access points of each identified pair of access points are within CS range of each other.

In some examples, the method may include determining a cost associated with each identified pair of access points based at least in part on the plurality of reference signal measurements. In some of these examples, performing channel selection for the plurality of access points may include selecting a channel for each of the access points that minimizes an aggregate cost associated with the identified at least one pair of access points. In some examples, the cost associated with each identified pair of access points may be further based at least in part on whether the access points of the pair of access points currently operate on the same channel. In some examples, the cost associated with each identified pair of access points may be further based at least in part on a medium access control (MAC) scheme associated with each pair of access points. In some examples, the MAC scheme associated with each pair of access points may include one of frequency re-use 1 or time domain multiplexing. In some examples, the cost associated with each identified pair of access points may be further based at least in part on whether one or more access points of the pair of access points operate within a dynamic frequency scaling or radar channel.

In some examples, the method may include receiving at least a portion of the plurality of reference signal measurements over a backhaul interface. In some examples, the method may include transmitting a channel selection to the plurality of access points over at least one backhaul interface.

In a tenth set of illustrative examples, another apparatus for wireless communications is described. In one configuration, the apparatus may include means for receiving a plurality of reference signal measurements. Each reference signal measurement may correspond to one of a plurality of access points and indicate interference with a shared spectrum from outside of a CCA sense range of a corresponding access point. The apparatus may also include means for performing channel selection for the plurality of access points based at least in part on the reference signal measurements. In some examples, the apparatus may further include means for implementing one or more aspects of the method for wireless communication described above with respect to the ninth set of illustrative examples.

In an eleventh set of illustrative examples, another apparatus for wireless communications is described. In one configuration, the apparatus may include a processor and memory coupled to the processor. The processor may be configured to receive a plurality of reference signal measurements. Each reference signal measurement may correspond to one of a plurality of access points and indicate interference with a shared spectrum from outside of a CCA sense range of a corresponding access point. The processor may also be configured to perform channel selection for the plurality of access points based at least in part on the reference signal measurements. In some examples, the processor may be configured to implement one or more aspects of the method for wireless communication described above with respect to the ninth set of illustrative examples.

In a twelfth set of illustrative examples, another computer program product for communication by a wireless communication apparatus in a wireless communication system is described. The computer program product may include a non-transitory computer-readable medium storing instructions executable by a processor to cause the wireless communication apparatus to receive a plurality of reference signal measurements. Each reference signal measurement may correspond to one of a plurality of access points and indicate interference with a shared spectrum from outside of a CCA sense range of a corresponding access point. The instructions may also be executable by the processor to cause the wireless communication apparatus to perform channel selection for the plurality of access points based at least in part on the reference signal measurements. In some examples, the instructions may also be executable by the processor to cause the wireless communication apparatus to implement one or more aspects of the method for wireless communication described above with respect to the ninth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
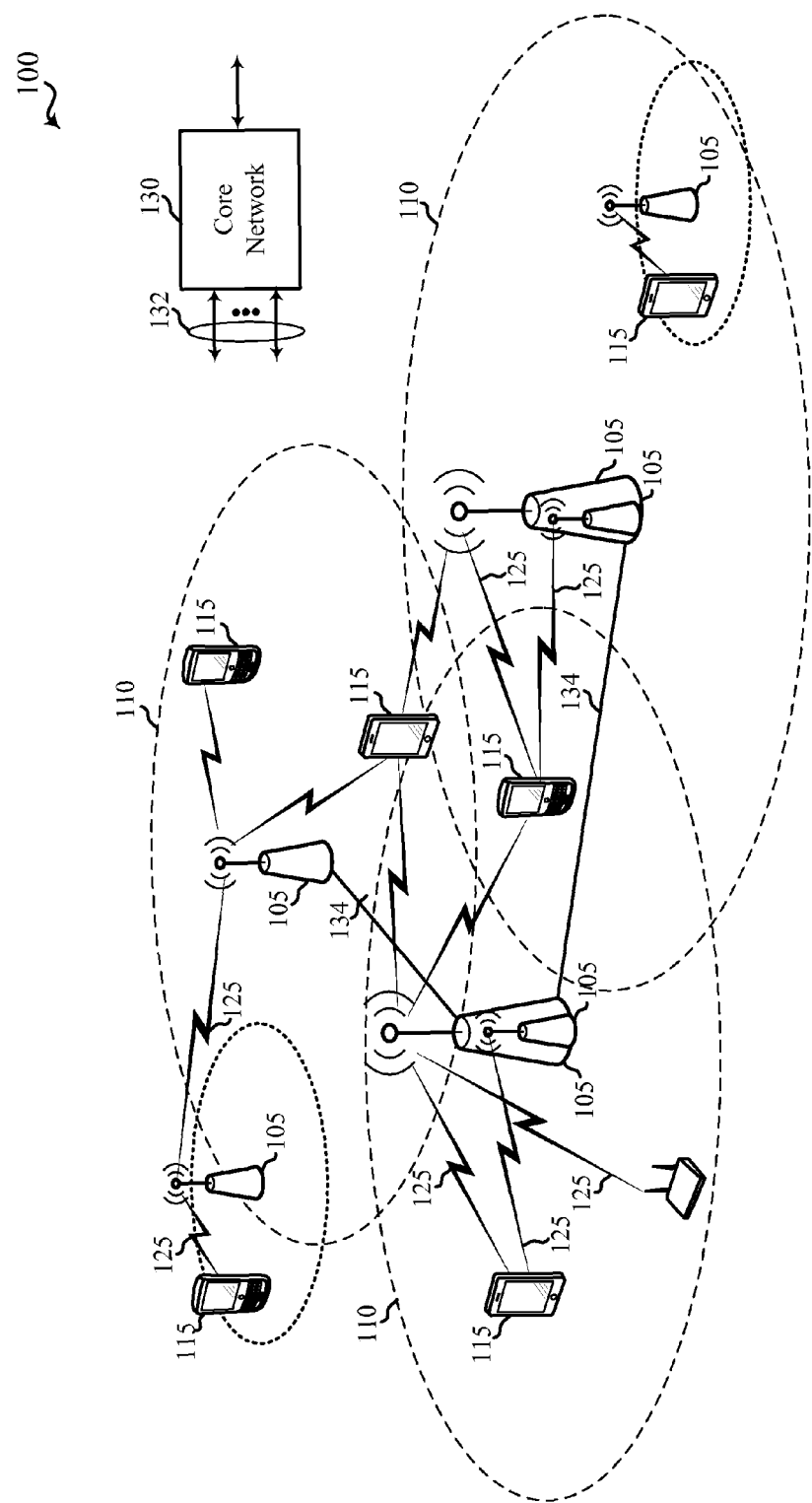
FIG. 1 shows a wireless communication system, in accordance with various aspects of the present disclosure.

Techniques are described in which measurements of a shared spectrum are acquired. Techniques are also described in which channel selection for the shared spectrum is performed for one or more access points using the measurements. The shared spectrum may be a radio frequency spectrum for which apparatuses may need to contend for access because the radio frequency spectrum is available, at least in part, for unlicensed use (e.g., Wi-Fi use and/or unlicensed Long Term Evolution (LTE)/LTE-Advanced (LTE-A) use). The access points may in some examples be LTE/LTE-A base stations.

In some examples, the disclosed techniques may include acquiring user equipment (UE) radio resource management (UE-RRM) measurements of a reference signal. The reference signal may in some examples be included in a clear channel assessment (CCA)-exempt transmission (CET) and/or in a CCA frame including the reference signal. When the reference signal is included in a CET, a CCA may be performed prior to transmission of the CET, thereby making the CET listen before talk (LBT)-aware (e.g., the CET including the reference signal may be transmitted with knowledge of whether the reference signal will or will not be subject to interference from other signals).

In some examples, a method may include transmitting a reference signal from an access point over a shared spectrum to a UE, and receiving a measurement of the reference signal from the UE. The reference signal may be transmitted in a CET and/or a CCA frame. The measurement may indicate interference with the shared spectrum from outside of a CCA sense range of the access point. In some examples, a method may include receiving at a UE over a shared spectrum the reference signal from the access point, and transmitting the measurement of the reference signal to the access point.

In some examples, the techniques may include performing channel selection based at least in part on the acquired UE-RRM measurements. For example, one method may include receiving a plurality of reference signal measurements. Each reference signal measurement may correspond to one of a plurality of access points and indicate interference with a shared spectrum from outside of a CCA sense range of the corresponding access point. The method may also include performing channel selection for the plurality of access points based at least in part on the received reference signal measurements.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE/LTE-A system for purposes of example, and LTE/LTE-A terminology is used in much of the description below, although the techniques are applicable beyond LTE/LTE-A applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a wireless communication system 100, in accordance with various aspects of the present disclosure. The wireless communication system 100 may include a plurality of access points (e.g., base stations, evolved NodeBs (eNBs), and/or wireless local area network (WLAN) access points) 105, a number of UEs 115, and a core network 130. Some of the access points 105 may communicate with the UEs 115 under the control of a base station controller (not shown), which may be part of the core network 130 or certain access points 105 (e.g., base stations and/or eNBs) in various embodiments. Some of the access points 105 may communicate control information and/or user data with the core network 130 through backhaul links 132. In some embodiments, some of the access points 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some embodiments, an access point 105 may be referred to as a base station, a base transceiver station (BTS), a radio base station, a radio transceiver, a basic service set (BSS), an extended service set (ESS), a NodeB, an eNB, a Home NodeB, a Home eNodeB, a WLAN access point, a Wi-Fi access point, or some other suitable terminology. The coverage area 110 for an access point may be divided into sectors making up only a portion of the coverage area (not shown). The wireless communication system 100 may include access points 105 of different types (e.g., macro, micro, and/or pico access points (or base stations)). The access points 105 may also utilize different radio technologies, such as wireless wide area network (WWAN) (e.g., cellular) and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap. In some examples, multiple access points may be co-located in a common cell of the wireless communication system 100.

In some embodiments, the wireless communication system 100 may include an LTE/LTE-A communication system (or network), which LTE/LTE-A communication system may support one or more modes of operation or deployment scenarios for LTE/LTE-A communication in a shared spectrum. In other embodiments, the wireless communication system 100 may support wireless communications using a shared spectrum and an access technology different from LTE/LTE-A, or a licensed spectrum and an access technology different from LTE/LTE-A. In LTE/LTE-A communication systems, the term evolved NodeB or eNB may be generally used to describe individual ones or groups of the access points 105. The wireless communication system 100 may be a heterogeneous network in which different types of eNBs provide coverage for various geographical regions. For example, each eNB may provide communication coverage for a macro cell, a pico cell, a femto cell, and/or other type of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the access points 105 via backhaul links 132 (e.g., an S1 interface, etc.). The access points 105 may also communicate with one another, e.g., directly or indirectly via backhaul links 134 (e.g., an X2 interface, etc.) and/or via backhaul links 132 (e.g., through core network 130). The wireless communication system 100 may support synchronous or asynchronous operation. For synchronous operation, the access points may have similar frame and/or gating timing, and transmissions from different access points may be approximately aligned in time. For asynchronous operation, the access points may have different frame and/or gating timing, and transmissions from different access points may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with different types of access points, such as macro eNBs, pico eNBs, femto eNBs, relays, and the like. A UE 115 may also be able to communicate over different access networks, such as cellular or other WWAN access networks, or WLAN access networks.

The communication links 125 shown in wireless communication system 100 may include uplinks for carrying uplink (UL) transmissions (e.g., from a UE 115 to an access points 105) and/or downlinks for carrying downlink (DL) transmissions (e.g., from an access point 105 to a UE 115). The UL transmissions may also be called reverse link transmissions, while the DL transmissions may also be called forward link transmissions. The downlink transmissions may be made using a licensed spectrum, a shared spectrum, or both. Similarly, the uplink transmissions may be made using a licensed spectrum, a shared spectrum, or both.

In some embodiments of the wireless communication system 100, various deployment scenarios for LTE/LTE-A communications in a shared spectrum may be supported, including a supplemental downlink mode in which LTE/LTE-A downlink capacity in a licensed spectrum may be offloaded to a shared spectrum, a carrier aggregation mode in which both LTE/LTE-A downlink and uplink capacity may be offloaded from a licensed spectrum to a shared spectrum, and a standalone mode in which LTE/LTE-A downlink and uplink communications between a base station (e.g., eNB) and a UE may take place in a shared spectrum. Access points 105 or eNBs as well as UEs 115 may support one or more of these or similar modes of operation. OFDMA communications signals may be used in the communication links 125 for LTE/LTE-A downlink transmissions in a shared spectrum and/or a licensed spectrum, while SC-FDMA communications signals may be used in the communication links 125 for LTE/LTE-A uplink transmissions in a shared spectrum and/or a licensed spectrum.

Figure 2:
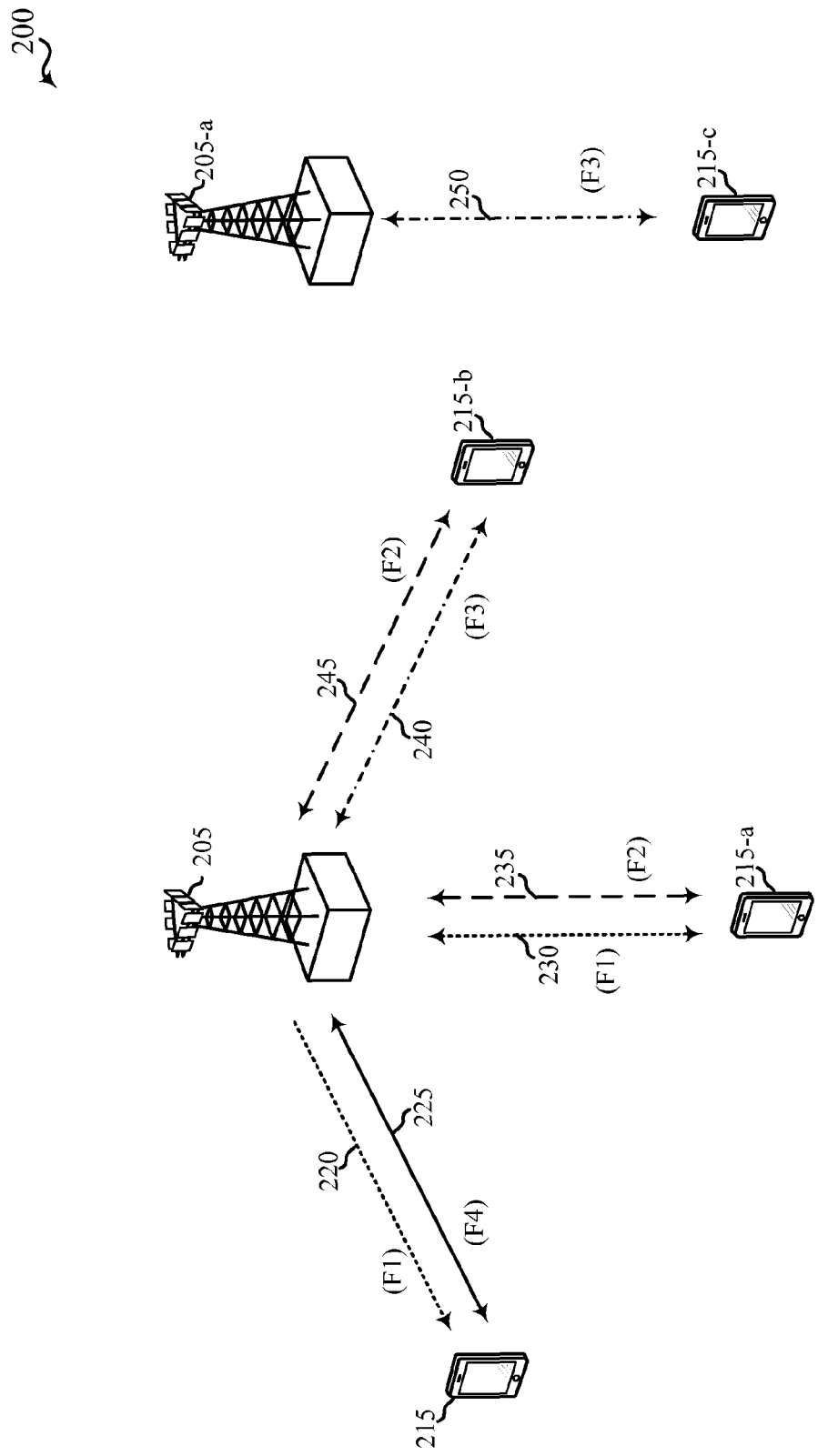
FIG. 2 shows a wireless communication system in which Long Term Evolution (LTE)/LTE-Advanced (LTE-A) is deployed under different scenarios using an shared spectrum, in accordance with various aspects of the present disclosure.

FIG. 2 shows a wireless communication system 200 in which LTE/LTE-A is deployed under different scenarios using shared spectrum, in accordance with various aspects of the present disclosure. More specifically, FIG. 2 illustrates examples of a supplemental downlink mode, a carrier aggregation mode, and a standalone mode in which LTE/LTE-A is deployed using a shared spectrum. The wireless communication system 200 may be an example of portions of the wireless communication system 100 described with reference to FIG. 1. Moreover, a first access point 205 and a second access point 205-a may be examples of aspects of one or more of the access points 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first access point 205 may transmit OFDMA waveforms to the first UE 215 using a downlink channel 220. The downlink channel 220 may be associated with a frequency F1 in a shared spectrum. The first access point 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed spectrum. The downlink channel 220 in the shared spectrum and the first bidirectional link 225 in the licensed spectrum may operate concurrently. The downlink channel 220 may provide a downlink capacity offload for the first access point 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed spectrum and needs to relieve some of the traffic and/or signaling congestion.

In one example of a carrier aggregation mode in the wireless communication system 200, the first access point 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with the frequency F1 in the shared spectrum. The first access point 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed spectrum. The second bidirectional link 230 may provide a downlink and uplink capacity offload for the first access point 205. Like the supplemental downlink described above, this scenario may occur with any service provider (e.g., MNO) that uses a licensed spectrum and needs to relieve some of the traffic and/or signaling congestion.

In another example of a carrier aggregation mode in the wireless communication system 200, the first access point 205 may transmit OFDMA waveforms to the third UE 215-b using a fourth bidirectional link 240 and may receive OFDMA waveforms, SC-FDMA waveforms, and/or resource block interleaved waveforms from the third UE 215-b using the fourth bidirectional link 240. The fourth bidirectional link 240 may be associated with a frequency F3 in the shared spectrum. The first access point 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed spectrum. The fourth bidirectional link 240 may provide a downlink and uplink capacity offload for the first access point 205. This example and those provided above are presented for illustrative purposes and there may be other similar modes of operation or deployment scenarios that combine LTE/LTE-A in licensed spectrum and shared spectrum for capacity offload.

As described above, one type of service provider that may benefit from the capacity offload offered by using LTE/LTE-A in shared spectrum is a traditional MNO having access rights to an LTE/LTE-A licensed spectrum. For these service providers, an operational example may include a bootstrapped mode (e.g., supplemental downlink, carrier aggregation) that uses the LTE/LTE-A primary component carrier (PCC) on the licensed spectrum and at least one secondary component carrier (SCC) on the shared spectrum.

In the carrier aggregation mode, data and control may, for example, be communicated in the licensed spectrum (e.g., via first bidirectional link 225, third bidirectional link 235, and fifth bidirectional link 245) while data may, for example, be communicated in the shared spectrum (e.g., via second bidirectional link 230 and fourth bidirectional link 240). The carrier aggregation mechanisms supported when using shared spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second access point 205-a may transmit OFDMA waveforms to the fourth UE 215-c using a bidirectional link 250 and may receive OFDMA waveforms, SC-FDMA waveforms, and/or resource block interleaved FDMA waveforms from the fourth UE 215-c using the bidirectional link 250. The bidirectional link 250 may be associated with the frequency F3 in the shared spectrum. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed spectrum.

In some examples, a transmitting apparatus such as one of the access points 105, 205, and/or 205-a described with reference to FIG. 1 and/or 2, and/or one of the UEs 115, 215, 215-a, 215-b, and/or 215-c described with reference to FIG. 1 and/or 2, may use a gating interval to gain access to a channel of a shared spectrum (e.g., to a physical channel of the shared spectrum). The gating interval may define the application of a contention-based protocol, such as a LBT protocol based on the LBT protocol specified in ETSI (EN 301 893). When using a gating interval that defines the application of an LBT protocol, the gating interval may indicate when a transmitting apparatus needs to perform a contention procedure, such as a CCA. The outcome of the CCA may indicate to the transmitting device whether a channel of a shared spectrum is available or in use for the gating interval (also referred to as an LBT frame or a CCA frame). When a CCA indicates that the channel is available (e.g., "clear" for use) for a corresponding CCA frame, the transmitting apparatus may reserve and/or use the channel of the shared spectrum during part or all of the CCA frame. When the CCA indicates that the channel is not available (e.g., that the channel is in use or reserved by another apparatus), the transmitting apparatus may be prevented from using the channel during the CCA frame.

Consider now a multi-operator wireless communication system in which each operator has access to a licensed spectrum as well as a shared spectrum. In such a wireless communication system, each operator may deploy an LTE/LTE-A Heterogeneous Network (HetNet) for use of its licensed spectrum. In each HetNet, an operator may deploy a plurality of different power class cells (e.g., one or more macro cells, pico cells, femto cells, etc.). Each of the different cells may provide a coverage area of different size (e.g., a coverage area with a differently sized radio boundary). Each operator may also provide a supplemental downlink (SDL) mode of operation using a shared spectrum (e.g., a radio frequency spectrum shared by the multiple operators and possibly other devices (e.g., Wi-Fi devices)). In some examples, the shared spectrum may be the 2.4 Gigahertz (GHz) industrial, scientific, and medical (ISM) band. The operators may in some examples provide access to the SDL mode of operation using different radio access technologies (RATs) (e.g., Wi-Fi, LTE/LTE-A, etc.).

Figure 3:
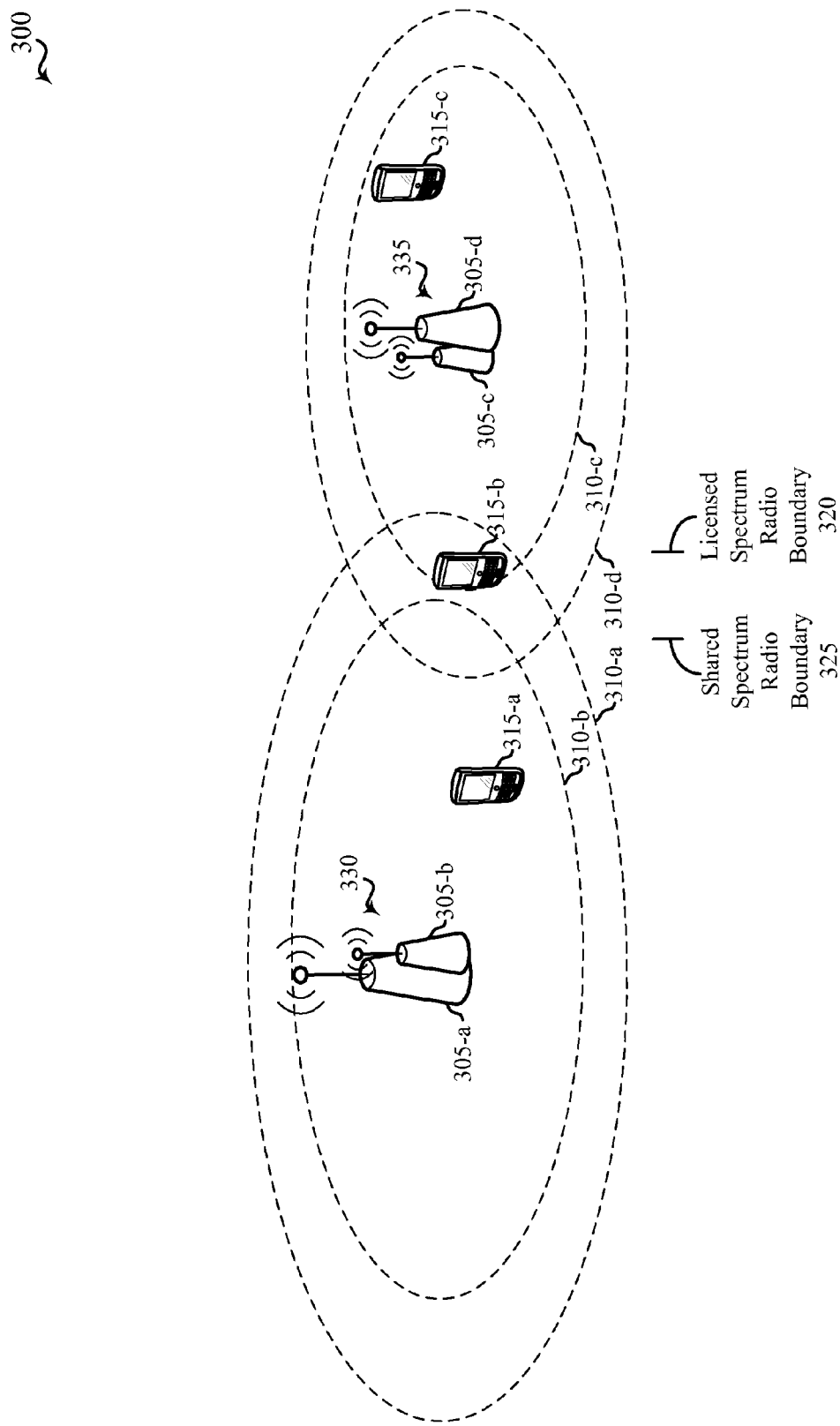
FIG. 3 shows a wireless communication system in which LTE/LTE-A is deployed using a licensed spectrum and a shared spectrum, in accordance with various aspects of the present disclosure.

In the multi-operator wireless communication system described in the preceding paragraph, the shared spectrum may have regulated transmit power and power spectral density (PSD) limitations, and hence, in some examples, only low power cells may be deployed for access to the shared spectrum. The deployment of only low power cells may in some cases result in different radio boundaries for cells that access the shared spectrum compared to cells that access the licensed spectrum, and while outdoor cells that access the shared spectrum may have greater transmit power than indoor cells that access the shared spectrum, the difference in transmit power between outdoor cells and indoor cells may be substantially less for cells that access the shared spectrum compared to cells that access the licensed spectrum. Some hypothetical examples, in terms of effective isotropic radiated power (EIRP), are provided below:

Pico cell (outdoor):
Licensed spectrum EIRP=30 dBm+5 dBi
Shared spectrum EIRP=27 dBm+3 dBi
Femto cell (indoor):
Licensed spectrum EIRP=20 dBm+0 dBi
Shared spectrum EIRP=17 dBm+7 dBi
Outdoor/indoor differential:
Licensed spectrum=15 dB EIRP
Shared spectrum=6 dB EIRP FIG. 3 shows a wireless communication system 300 in which LTE/LTE-A is deployed using a licensed spectrum and a shared spectrum, in accordance with various aspects of the present disclosure. More specifically, FIG. 3 illustrates an example of a supplemental downlink mode in which LTE/LTE-A is deployed using the shared spectrum. The wireless communication system 300 may be an example of portions of the wireless communication system 100 and/or 200 described with reference to FIG. 1 and/or 2. Moreover, a first access point, 305-a, a second access point 305-b, a third access point 305-c, and/or a fourth access point 305-d may be examples of aspects of one or more of the access points 105 and/or 205 described with reference to FIG. 1 and/or 2, while a UE 315-a, a UE 315-b, and a UE 315-c may be examples of aspects of one or more of the UEs 115 and/or 215 described with reference to FIG. 1 and/or 2.

By way of example, the first access point 305-a and the second access point 305-b may belong to a pico cell 330 of an operator, and the third access point 305-c and the fourth access point 305-d may belong to a femto cell 335 of the operator. By way of further example, the first access point 305-a and the third access point 305-c may provide access to the licensed spectrum, and the second access point 305-b and the fourth access point 305-d may provide access to the shared spectrum. Each of the pico cell 330 and the femto cell 335 may provide a primary component carrier (PCC) over the licensed spectrum and one or more secondary component carriers (SCCs) over the shared spectrum.

Each of the access points may provide a coverage area of different size (e.g., a coverage area with a differently sized radio boundary). For example, the first access point 305-a may provide the coverage area 310-a, the second access point 305-b may provide the coverage area 310-b, the third access point 305-c may provide the coverage area 310-c, and the fourth access point 305-d may provide the coverage area 310-d. The various coverage areas result in there being a licensed spectrum radio boundary 320 between the pico cell 330 and the femto cell 335 that differs from a shared spectrum radio boundary 325 between the pico cell 330 and the femto cell 335.

By way of example, the PCC and any SCCs serving the first UE 315-a may be associated with the pico cell 330 and access points 305-a and 305-b, whereas the PCC and any SCCs serving the third UE 315-c may be associated with the femto cell 335 and access points 305-c and 305-d. However, various PCC and SCC options exist for the second UE 315-b, which is located within the coverage areas 310-a of the pico cell 330 and first access point 305-a, and the coverage area 310-c of the femto cell 335 and second access point 305-c, for purposes of accessing the licensed spectrum, and located within the coverage area 310-*d* of the femto cell and the fourth access point 305-*d* for purposes of accessing the shared spectrum. The various options that exist for providing a PCC and any SCCs for serving the second UE 315-*b* are described below.

In a first option for providing a PCC for serving the second UE 315-*b*, the second UE 315-*b* may be served by a strongest PCC cell (e.g., a cell providing the strongest PCC for the second UE 315-*b*) and the second UE 315-*b* may not be served by an SCC. In the example shown, the strongest PCC cell for the second UE 315-*b* may be the pico cell 330.

In a second option for providing a PCC and any SCCs for serving the second UE 315-*b*, the UE 315-*b* may be served by a PCC of a strongest SCC cell (e.g., a cell providing the strongest SCC for the second UE 315-*b*), and any SCCs may also be provided by the strongest SCC cell. In the example shown, the strongest SCC cell for the second UE 315-*b* may be the femto cell 335, and the PCC and any SCCs for serving the second UE 315-*b* may be provided by the femto cell 335. If the PCC of the second UE 315-*b* is not currently provided by the femto cell 335, the second UE 315-*b* may be handed over to the femto cell 335, and any SCCs may be established with the femto cell 335. When a PCC of the femto cell 335 cannot be received by the second UE 315-*b* (e.g., control and data), cell range expansion (CRE) may be attempted for the third access point 305-*c* of the femto cell 335. For example, almost blank subframes (ABS) may be configured on the pico cell 330, and/or cell-specific reference signal (CRS) interference cancelation (CRS-IC) and/or control-IC and/or data-IC may be employed. Also or alternatively, the transmit power of the pico cell 330 may be reduced to extend the nominal coverage area 310-*c* of the femto cell 335.

In a third option for providing a PCC and any SCCs for serving the second UE 315-*b*, the second UE 315-*b* may be served by a strongest PCC cell (e.g., a cell providing the strongest PCC for the second UE 315-*b*), and any SCCs may also be provided by the strongest PCC cell (e.g., if the SCCs are strong enough to serve the second UE 315-*b*). In the example shown, the strongest PCC cell for the second UE 315-*b* may be the pico cell 330. When an SCC of the pico cell 330 cannot be received by the second UE 315-*b* (e.g., due to interference on the SCC from the neighboring femto cell 335), the pico cell 330 may move the SCC to a different channel or request the femto cell 335 (of the same operator) to change its channel. When no channels are available, the second UE 315-*b* may request the femto cell 335 to reduce its transmit power or request time domain multiplexing (TDM) orthogonalization like "ABS on the femto." Also or alternatively, LBT media access control (MAC) operation (e.g., TDM MAC operation) may be used by the pico cell 330 and the femto cell 335, even though the pico cell 330 and the femto cell 335 belong to the same operator.

In a fourth option for providing a PCC and any SCCs for serving the second UE 315-*b*, the second UE 315-*b* may be served by a strongest PCC cell for purposes of receiving a PCC, and served by a strongest SCC cell for purposes of receiving any SCCs. This fourth option may require multiflow (e.g., dual connectivity) operation between the pico cell 330 and the femto cell 335. Such multiflow operation may not be feasible for an SDL mode of operation unless there is a fiber backhaul connecting the pico cell 330 and the femto cell 335.

The example described with reference to FIG. 3 shows that it is possible for a UE to receive an SCC from a cell operating over a shared spectrum, which cell may be other than a strongest SCC cell for a UE (e.g., because the SCC association for the UE is tied to the UE's PCC association).

The example described with reference to FIG. 3 also shows that there are scenarios in which channel selection may need to be designed to account for asymmetric licensed spectrum and shared spectrum radio boundaries. The example described with reference to FIG. 3 also shows that there are scenarios that may require both intra-frequency measurements and inter-frequency measurements for channel selection.

When a channel selection is made for an access point operating over a shared spectrum, the channel selection may be based on various measurements. The measurements may include measurements of the signals of one or more other access points (e.g., base stations and/or Wi-Fi access points) operating over the shared spectrum. An access point may acquire measurements of the signals of one or more base stations by means of an LBT-aware network listen (NL) performed by the access point, or by means of an LBT-aware UE-RRM measurements. Techniques for acquiring LBT-aware UE-RRM measurements are described, for example, with reference to FIG. 4, 5, 6, 7, 8, 9, 10, 11, 12, 15, 16, 17, 18, 19, 20, 21, 22, and/or 23. An access point may acquire measurements of the signals of one or more Wi-Fi access points by means of performing IEEE Standard 802.11 beacon received signal strength indication (Wi-Fi-RSSI) measurements (e.g., when the access point is a Wi-Fi access point or is a base station and/or eNB that is co-located with a Wi-Fi access point) or by acquiring 802.11k measurements from UEs that are IEEE Standard 802.11k enabled (e.g., when the access point is a base station and/or eNB).

When a channel selection is made for an access point operating over a shared spectrum, and when the access point is operating on dynamic frequency selection (DFS or RADAR) channels, acquired measurements over the RADAR channel may be discounted to make the measurements less suitable for channel selection (e.g., a RADAR penalty may be imposed).

For each channel "x" that may be selected during channel selection, the above-noted measurements may be fused to compute a channel quality metric as a function of the metrics (e.g., Channel Quality Metric$_{channel\_x}$=f(NL, UE-RMM, Wi-Fi-RSSI, RADAR penalty)). In some examples, the fusing function "f" may depend on a MAC interaction defined in the channel selection algorithm.

Figure 4:
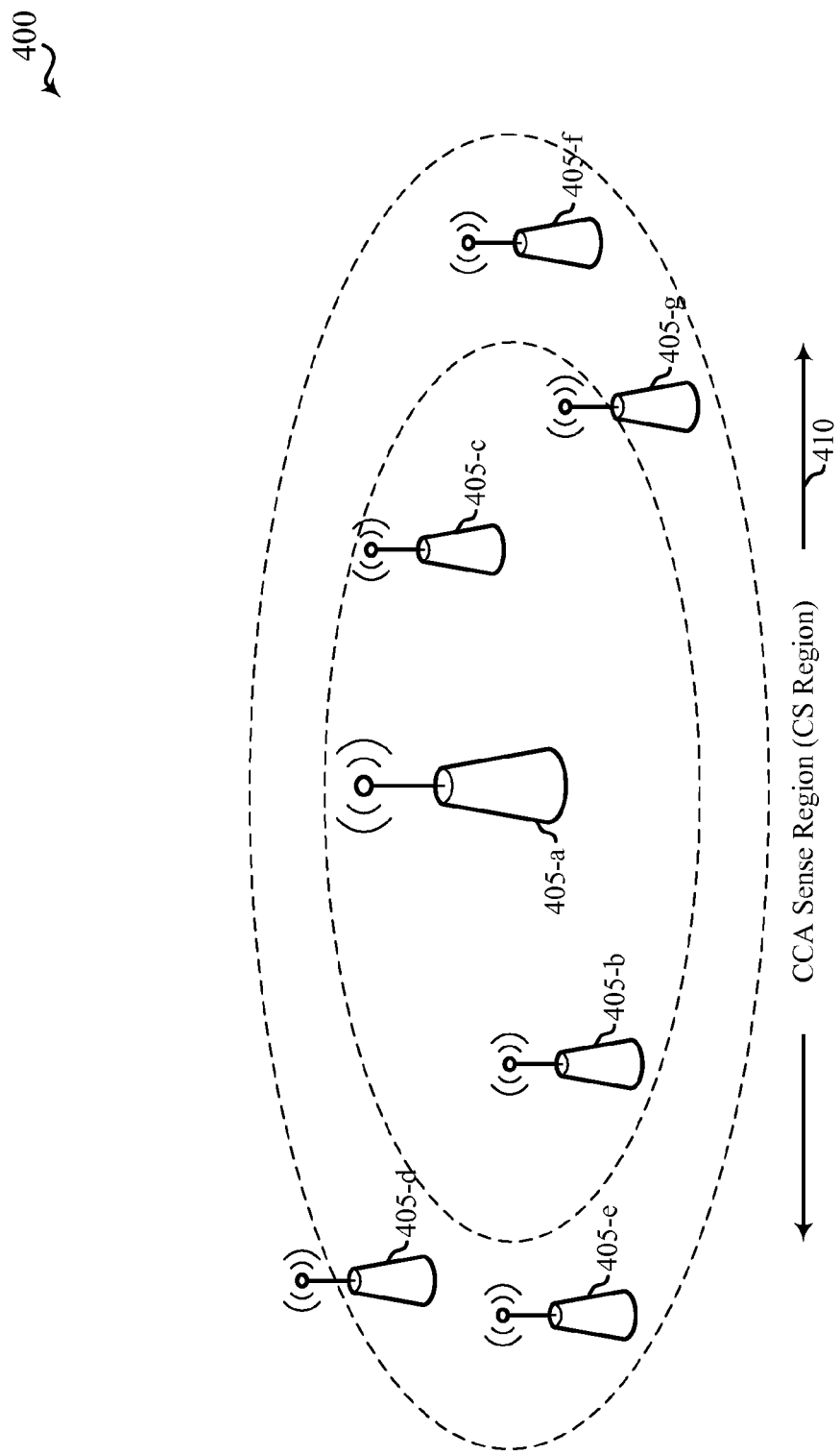
FIG. 4 shows a wireless communication system in which LTE/LTE-A is deployed using a licensed spectrum and a shared spectrum, in accordance with various aspects of the present disclosure.

FIG. 4 shows a wireless communication system 400 in which LTE/LTE-A is deployed using a licensed spectrum and a shared spectrum, in accordance with various aspects of the present disclosure. The wireless communication system 400 may be an example of portions of the wireless communication system 100, 200, and/or 300 described with reference to FIG. 1, 2, and/or 3. Moreover, a first access point, 405-*a*, a second access point 405-*b*, a third access point 405-*c*, a fourth access point 405-*d*, a fifth access point 405-*e*, a sixth access point 405-*f*, and/or a seventh access point 405-*g* may be examples of aspects of one or more of the access points 105, 205, 305-*a*, 305-*b*, 305-*c*, and/or 305-*d* described with reference to FIG. 1, 2, and/or 3.

The first access point 405-*a* may be capable of communicating with other apparatuses over a shared spectrum and may perform a CCA, prior to communicating over the shared spectrum, to determine whether the shared spectrum is clear for use. A CCA may be successful when the power received by the access point 405-*a* from other transmitting apparatuses (e.g., the second access point 405-*b*, the third access point 405-*c*, the fourth access point 405-*d*, the fifth access point 405-*e*, the sixth access point 405-*f*, and/or the seventh access point 405-*g*) is less than a CCA threshold. The CCA threshold may define a region (e.g., a CCA sense region or CS range 410) around the first access point 405-*a*. In conformance with an LBT protocol, there should be no LBT-conforming transmissions within the CS range 410 when the first access point 405-*a* is transmitting.

Figure 5:
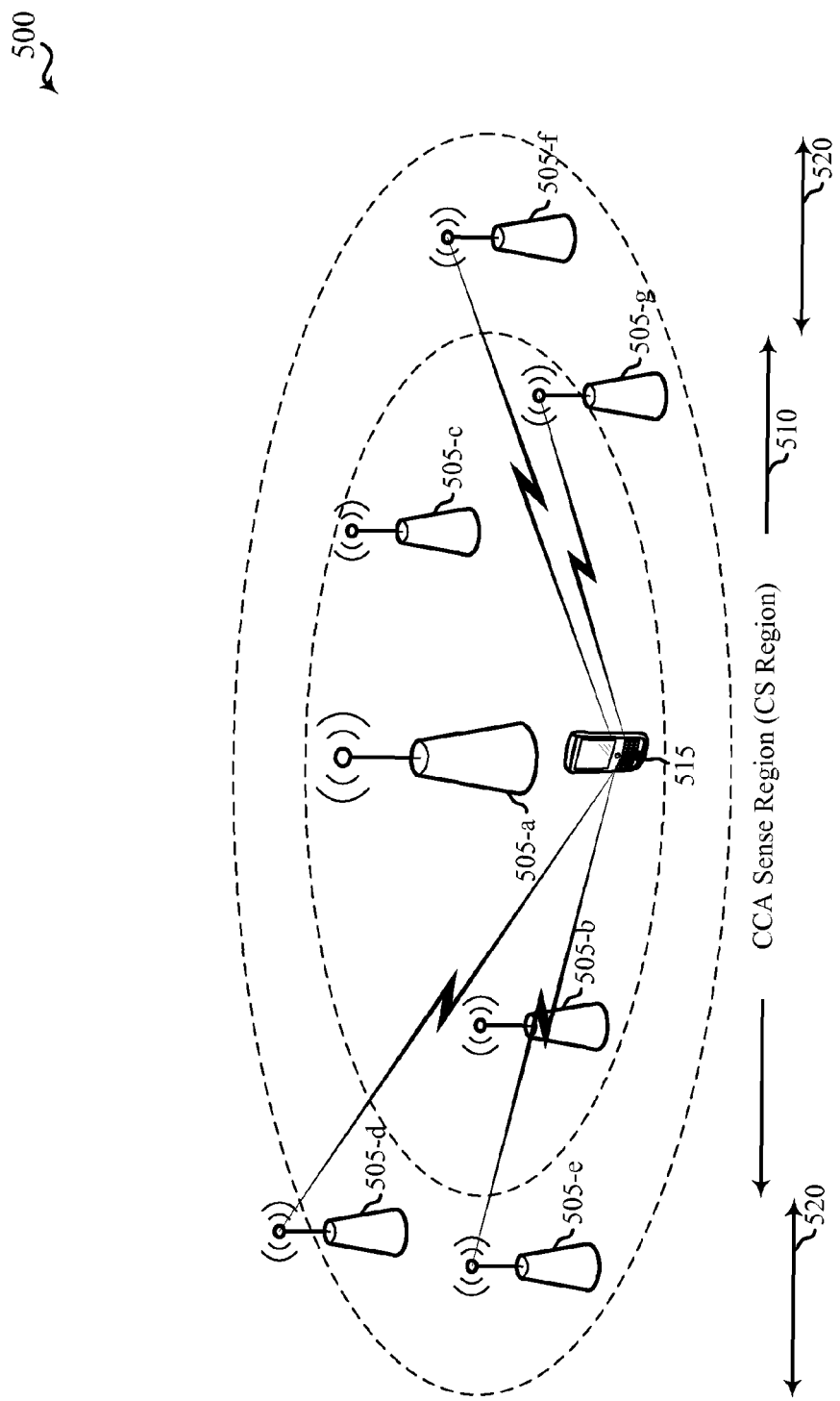
FIG. 5 shows a wireless communication system in which LTE/LTE-A is deployed using a licensed spectrum and a shared spectrum, in accordance with various aspects of the present disclosure.

FIG. 5 shows a wireless communication system 500 in which LTE/LTE-A is deployed using a licensed spectrum and a shared spectrum, in accordance with various aspects of the present disclosure. The wireless communication system 500 may be an example of portions of the wireless communication system 100, 200, 300, and/or 400 described with reference to FIG. 1, 2, 3, and/or 4. Moreover, a first access point, 505-*a*, a second access point 505-*b*, a third access point 505-*c*, a fourth access point 505-*d*, a fifth access point 505-*e*, a sixth access point 505-*f*, and/or a seventh access point 505-*g* may be examples of aspects of one or more of the access points 105, 205, 305-*a*, 305-*b*, 305-*c*, 305-*d*, 405-*a*, 405-*b*, 405-*c*, 405-*d*, 405-*e*, 405-*f*, and/or 405-*g* described with reference to FIG. 1, 2, 3, and/or 4, while a UE 515 may be an example of aspects of one or more of the UEs 115, 215, 215-*a*, 215-*b*, 215-*c*, 315-*a*, 315-*b*, and/or 315-*c*.

The first access point 505-*a* may be capable of communicating with other apparatuses, such as the UE 515, over a shared spectrum. The first access point 505-*a* may perform a CCA, prior to communicating over the shared spectrum, to determine whether the shared spectrum is clear for use. A CCA may be successful when the power received by the access point 505-*a* from other transmitting apparatuses (e.g., the second access point 505-*b*, the third access point 505-*c*, the fourth access point 505-*d*, the fifth access point 505-*e*, the sixth access point 505-*f*, and/or the seventh access point 505-*g*) is less than a CCA threshold. The CCA threshold may define a region (e.g., a CCA sense region or CS range 510) around the first access point 505-*a*. In conformance with an LBT protocol, there should be no LBT-conforming transmissions within the CS range 510 when the first access point 505-*a* is transmitting.

When making interference measurements, the access point 505-*a* must discount the interference that arises from inside of the CS range 510 (e.g., interference arising from the second access point 505-*b* and/or the third access point 505-*c*) and account only for interference that arises from outside of the CS range 510 (e.g., interference arising from the region 520, or from the fourth access point 505-*d*, the fifth access point 505-*e*, the sixth access point 505-*f*, and/or the seventh access point 505-*g*). In some examples, the access point 505-*a* may estimate the interference that arises from outside of the CS range 510 by means of an LBT-aware NL and/or an LBT-aware UE-RRM measurement. UE-RRM measurements may be performed, for example, by UEs (e.g., the UE 515) operating inside of the CS range 510 that may experience interference from apparatuses (e.g., the fourth access point 505-*d*, the fifth access point 505-*e*, the sixth access point 505-*f*, and/or the seventh access point 505-*g*) outside of the CS range 510.

By way of example, an LBT-aware NL performed by an access point may measure the power received from other access points. The access point performing the LBT-aware NL may distinguish LBT-conforming access points and LBT-non-conforming access points by looking for signatures specific to an LBT procedure (e.g., a channel usage beacon signal (CUBS) and/or a CET). While computing an interference measurement, the access point may discount the power received from all LBT-conforming access points within its CS range. In some examples, the set of LBT-conforming access points within the CS range of an access point maybe estimated by computing the path loss (PL) to every LBT-conforming access point. A PL may be computed from a transmit power read from a system information block (SIB) message, or from a received power of other access points. The PL may be used to determine the access point's CS range and determine whether a neighboring access point is within the access point's CS range.

By way of further example, an access may acquire a UE-RRM measurement in response to transmitting a reference signal that may be measured by a UE. In some examples, a reference signal may be transmitted in a CET. However, a CET is an LBT-non-conforming signal. In some examples, an LBT-conforming reference signal may be transmitted by performing a CCA prior to (e.g., immediately prior to) transmission of a CET, despite the CET not requiring the performance of a successful CCA prior to its transmission. In other examples, an LBT-conforming reference signal may be transmitted by transmitting the reference signal in an LBT-conforming subframe including one or more reference signals but no data.

Figure 6:
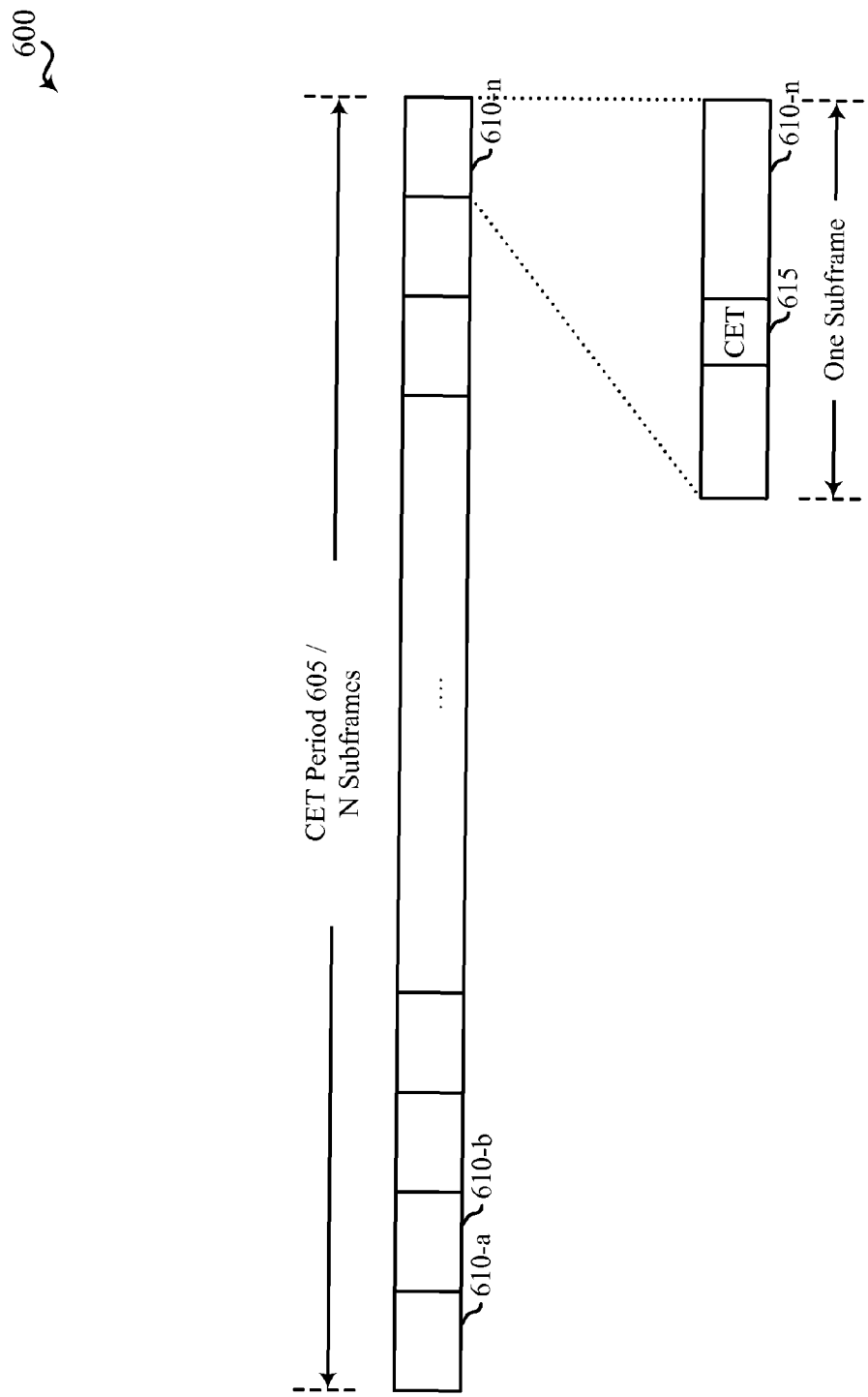
FIG. 6 shows an example of a transmission of a clear channel assessment (CCA)-exempt transmission (CET) by an access point over a shared spectrum, in accordance with various aspects of the present disclosure.

FIG. 6 shows an example 600 of a transmission of a CET 615 by an access point over a shared spectrum, in accordance with various aspects of the present disclosure. More particularly, FIG. 6 shows a CET period 605 of N subframes (e.g., subframes 610-*a*, 610-*b*, . . . , 610-*n*), in which a CET 615 may be transmitted in one of the subframes (e.g., in a subframe 610-*n*). The CET 615 may in some cases include one or more reference signals, synchronization signals, and/or a broadcast payload for camping purposes. In some examples, the CET 615 may assist UEs with cell discovery and synchronization. In some examples, each subframe may have a duration of one millisecond, and the CET 615 may be transmitted once every 80, 160, and/or 320 milliseconds. The CET 615 may be transmitted over the shared spectrum regardless of whether a CCA performed for the subframe 610-*a* succeeded or failed. However, other subframes (e.g., subframes 610-*a*, 610-*b*, etc.) of the CET period 605 may only be transmitted when the CCA performed for the respective subframe (or for the frame of which the respective subframe forms a part) succeeds.

In some examples, one or more reference signals included in the CET 615 may be measured. For example, one or more reference signals included in the CET 615 may be measured to produce a reference signal received power (RSRP) measurement and/or a reference signal received quality (RSRQ) measurement.

A potential disadvantage of the CET 615 is that a CET is LBT-non-conforming. That is, the CET 615 may be transmitted regardless of whether a CCA performed for the subframe 610-*n* (or for the frame of which the respective subframe forms a part) succeeds. A way to make a CET LBT-conforming is described with reference to FIG. 7.

Figure 7:
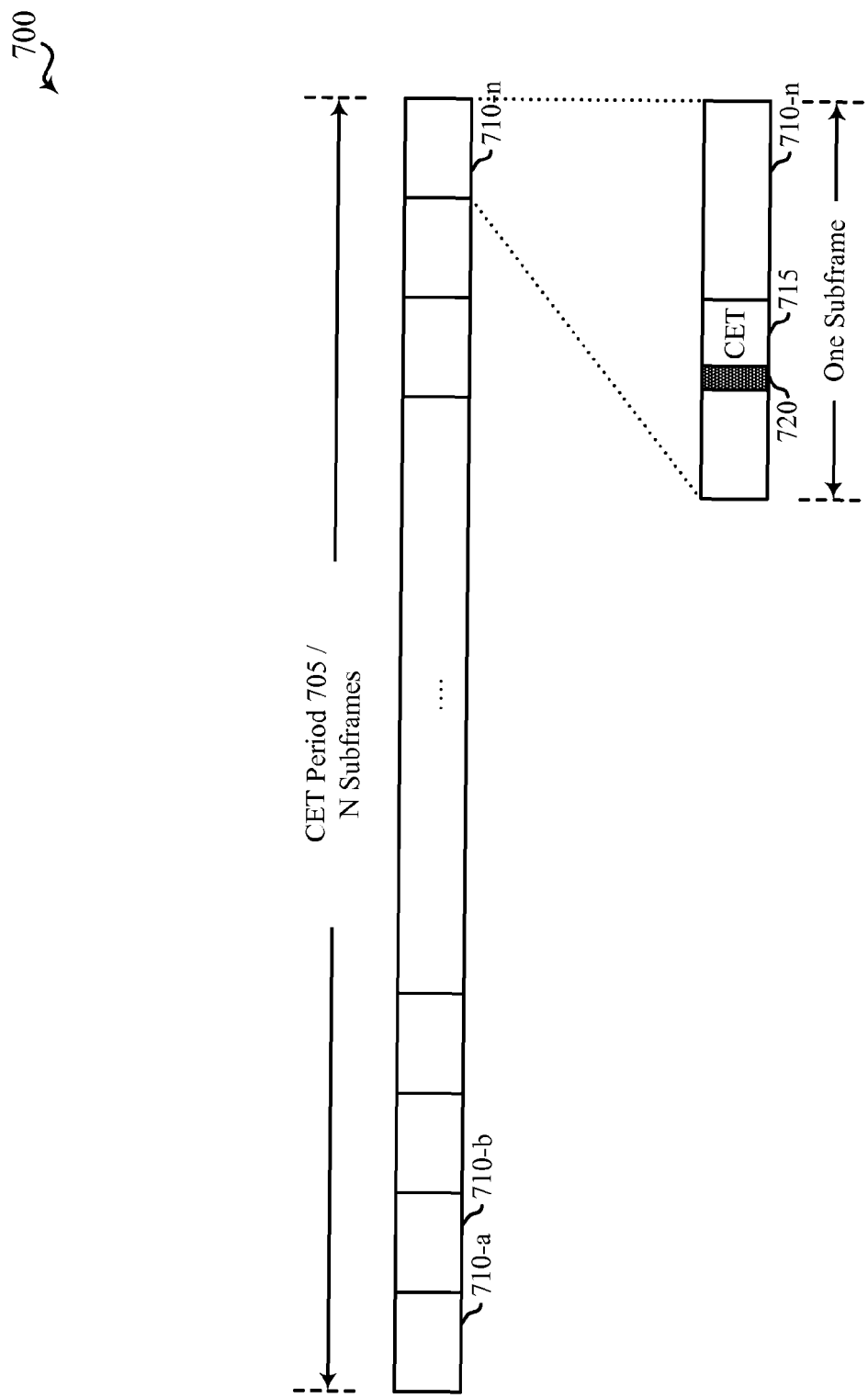
FIG. 7 shows an example of a transmission of a CET by an access point over a shared spectrum, in accordance with various aspects of the present disclosure.

FIG. 7 shows an example 700 of a transmission of a CET 715 by an access point over a shared spectrum, in accordance with various aspects of the present disclosure. More particularly, FIG. 7 shows a CET period 705 of N subframes (e.g., subframes 710-*a*, 710-*b*, . . . , 710-*n*), in which a CET 715 may be transmitted in one of the subframes (e.g., in a subframe 710-*n*). The CET 715 may in some cases include one or more reference signals, synchronization signals, and/or a broadcast payload for camping purposes. In some examples, the CET 715 may assist UEs with cell discovery and synchronization. In some examples, each subframe may have a duration of one millisecond, and the CET 715 may be transmitted once every 80, 160, and/or 320 milliseconds. The CET 715 may be transmitted over the shared spectrum regardless of whether a CCA performed for the subframe 710-*a* succeeded or failed. However, the CET 715 may be made substantially LBT-conforming by performing a CCA 720 prior to (e.g., immediately prior to) transmission of the CET 715.

The CCA 720 may determine whether the shared spectrum is free from interference within the CS range of the access point. When the CCA 720 is successful, measurements of a reference signal included in the CET 715 may be presumed to indicate interference from outside of a CS range of the access point that transmits the CET 715. When the CCA 720 is not successful, measurements of a reference signal included in the CET 715 may indicate interference from inside of and outside of the CS range of the access point that transmits the CET 715.

In some examples, one or more reference signals included in the CET 715 may be measured. For example, one or more reference signals included in the CET 715 may be measured to produce a RSRP measurement and/or a RSRQ measurement. When the CCA 720 fails, an RSRQ measurement of a reference signal included in the CET 715 may not be useful.

In some examples, an indication of whether the CCA 720 was successful may be included in the CET 715. The indication may enable a UE that receives the CET 715 to determine whether the CCA 720 was successful. In some examples, the indication of whether the CCA 720 was successful may be encoded in a single bit. One value of the bit may indicate a successful CCA and/or a CLEAR shared spectrum, while the other value of the bit may indicate a failed CCA and/or a BUSY shared spectrum. Under some scenarios, CET-on-CET interference between partially overlapping or adjacent CETs transmitted by the access points (e.g., base stations) of different public land mobile networks (PLMNs) may result in the bit always indicating the shared spectrum is BUSY.

When the CCA 720 is successful but all of the access points (e.g., base stations) of a PLMN transmit the CET 715 at the same time, an RSRQ measurement of a reference signal included in the CET 715 may be pessimistic.

Figure 8:
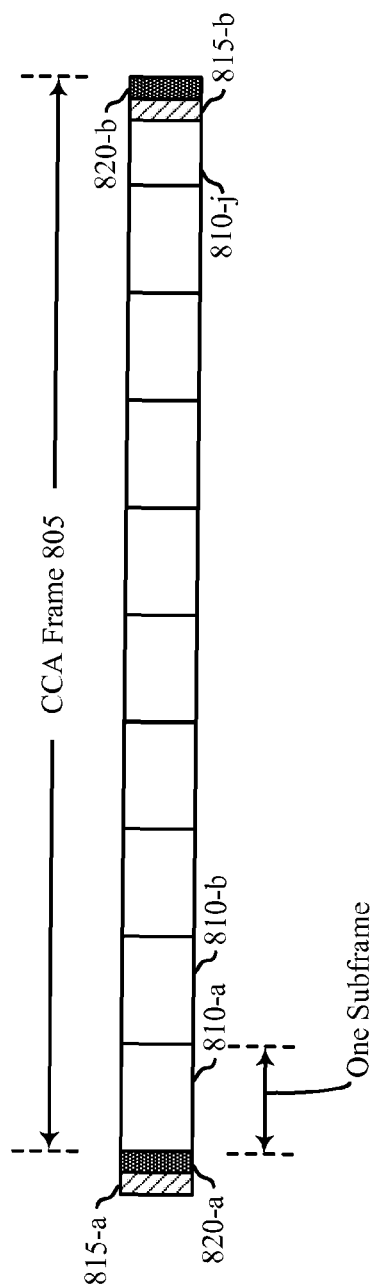
FIG. 8 shows an example of a transmission of a CCA frame by an access point over a shared spectrum, in accordance with various aspects of the present disclosure.

FIG. 8 shows an example 800 of a transmission of a CCA frame 805 by an access point over a shared spectrum, in accordance with various aspects of the present disclosure. More particularly, and by way of example, FIG. 8 shows a CCA frame 805 having ten subframes (e.g., subframes 810-a, 810-b, . . . , 810-j). A CCA 815-a may be performed before the CCA frame 805 begins (or alternatively at the beginning of the CCA frame 805) to determine whether the access point may transmit during the CCA frame 805. If the access point successfully contends for access to the CCA frame, the access point may transmit a reference signal (e.g., a channel-specific reference signal (CRS) type of reference signal) during the CCA frame 805. Following a successful contention for access to the CCA frame 805, and prior to the start of the CCA frame 805, the access point may transmit a CUBS 820-a.

Because the CCA frame 805 is LBT-conforming, a measurement of the reference signal included in the CCA frame 805, by a UE, may indicate interference with a shared spectrum from outside of a CS range of the access point.

Near the end of the CCA frame 805, the access point may perform a CCA 815-b to contend for access to a next CCA frame (and if successful, may transmit a CUBS 820-b following the CCA 815-b).

Using measurements from different sources, including LBT-aware NL measurements, LBT-aware UE-RRM measurements, and/or Wi-Fi-RSSI measurements, an access point (e.g., a base station and/or eNB) may compute a signal-to-interference-plus-noise ratio (SINR) for each of its UEs, subject to interference from outside the CS range of the access point.

When selecting a channel for operation of an access point in a shared spectrum, an objective may be to operate the access point on a best channel based on the projected rate for the UEs of the access point. For example, an access point may determine the projected rate for its UEs based on acquired measurements and select the channel with the maximum projected rate for its UEs. These determinations (including the channel selection) may be made in a centralized or distributed manner. When made in a centralized manner, measurements made by access points and/or their UEs may be exchanged between the access points of an operator, transmitted to one access point of the operator, and/or transmitted to a core network such as the core network 130 described with reference to FIG. 1. The measurements may be exchanged or transmitted, for example, over a backhaul interface such as an X2 interface. When made in a distributed manner, an access point may autonomously select a channel for operation in the shared spectrum.

An example of an algorithm for performing centralized channel selection is described below.

Consider a graph of nodes (vertices) where $V = V_{op} \cup V_{\overline{op}}$, where $V_{op}$ are the access points (e.g., base stations and/or eNBs) operating over a shared spectrum and controlled by an operator for which channel selection is being performed, and where $V_{\overline{op}}$ are the access points (e.g., base stations and/or eNBs and/or Wi-Fi access points) not controlled by the operator. In such a graph, the edge-set E may contain the pair of access points (u, v) such that $u \in V$ and $v \in V$ are in CS range of each other. This defines the interference graph G(V, E). Channel selection may be posed as an optimization on the graph G(V, E) (e.g., a minimum cost coloring problem). For example, a cost, c(u, v), may be defined for each $(u, v) \in E$. Suitable costs may be defined based at least in part on one or more of the measurements described herein. The cost, c(u, v), may be the cost that node u has to bear/incur because of the interference resulting from its interaction with v.

For an access point, u, that is a base station and/or eNB operating over the shared spectrum, the cost c(u, v) when v operates on the same channel as u and is operated by the same operator as u may be a if CRE is used on the shared spectrum, else b if CRE is not used on the shared spectrum. For an access point, u, that is a base station and/or eNB operating over the shared spectrum, the cost c(u, v) when v operates on the same channel as u and is operated by a different operator than u may be c if there is a sync(coop) LBT MAC between u and v, else d if there is an asynchronous (non-cooperative) LBT MAC between u and v. For an access point, u, that is a base station and/or eNB operating over the shared spectrum, the cost c (u, v) when v operates on the same channel as u and is operated by a different operator/entity as u (e.g., when u is an LTE/LTE-A base station and/or eNB and v is a Wi-Fi access point) may be e. For an access point, u, that is a base station and/or eNB operating over the shared spectrum, the cost c (u, v) when v operates on a different channel than u is zero (i.e., c (u,v)=0). The costs a, b, c, d, e may have the relationship $a \leq b \leq c \leq d \leq e \leq 0$.

For an access point, u, that is a Wi-Fi access point operating over the shared spectrum, the cost c (u, v) when v operates on the same channel as u may be z, else zero (i.e., c (u,v)=0) when v operates on a different channel as u.

As an example, consider a cost structure assuming full-buffer traffic. Let $K_u$ denote the set of UEs served by node u. For each UE k ∈ $K_u$, let SINR(k) denote the geometry of UE k, and let $SINR_{-v}(k)$ denote geometry of UE k assuming that v does not interfere with k. Let $\rho_k$ and $\rho_{-v}(k)$ denote the corresponding link spectral efficiencies (using constrained capacity). For cost structures a and b, under the above assumption, $$c(u, v) = \frac{1}{K_u}(\rho_{-v} - \rho_v)$$

for a TDM MAC, and $$c(u, v) = \frac{1}{2K_u}\rho_{-v}$$

for a frequency re-use 1 MAC. A frequency re-use 1 MAC is a MAC where all access points make use of all of the available time-frequency resources without any form of time or frequency division multiplexing.

Given the above example, a graph optimization for operator op may be $\min_{(u,v) \in E \text{ and } u \in V_{op}} \Sigma_{u,v} c(u,v)$ (where the number of channels/colors may be ≤M. Each operator may run this optimization on a subgraph of nodes it controls. For a multi-operator setting, this may be a game problem (e.g., there may not be equilibrium). In some examples, the optimization may be run while alternating between operators for a few rounds.

Figure 9:
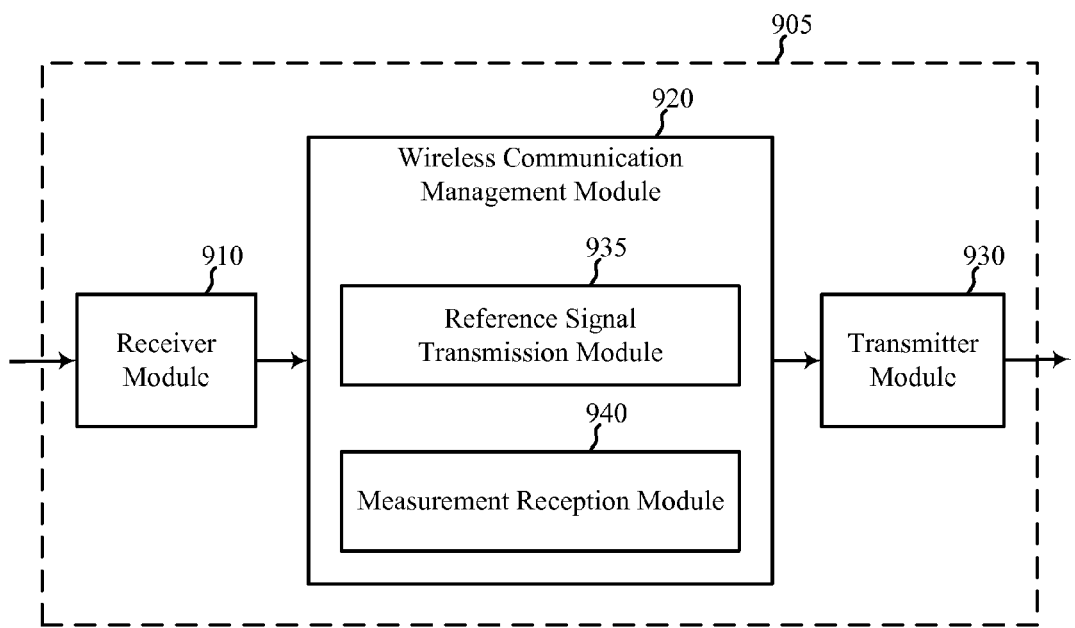
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the access points 105, 205, 205-a, 305-a, 305-b, 305-c, 305-d, 405, and/or 505 described with reference to FIG. 1, 2, 3, 4, and/or 5. The apparatus 905 may in some examples be an LTE/LTE-A base station. The apparatus 905 may also be a processor. The apparatus 905 may include a receiver module 910, a wireless communication management module 920, and/or a transmitter module 930. Each of these components may be in communication with each other.

The components of the apparatus 905 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may include at least one radio frequency (RF) receiver, such as at least one RF receiver operable to receive transmissions over a licensed spectrum (e.g., a radio frequency spectrum for which apparatuses do not contend for access because the radio frequency spectrum is licensed to particular users (e.g., LTE/LTE-A users) for particular uses) and/or a shared spectrum (e.g., a radio frequency spectrum for which apparatuses may need to contend for access because the radio frequency spectrum is available, at least in part, for unlicensed use (e.g., Wi-Fi use and/or unlicensed LTE/LTE-A use)). In some examples, the licensed spectrum and/or the shared spectrum may be used for LTE/LTE-A communications, as described, for example, with reference to FIG. 1, 2, 3, 4, and/or 5. The receiver module 910 may be used to receive various types of data and/or control signals (i.e., transmissions) over one or more communication links of a wireless communication system, such as one or more communication links of the wireless communication system 100, 200, 300, 400, and/or 500 described with reference to FIG. 1, 2, 3, 4, and/or 5. The communication links may be established over the licensed spectrum and/or the shared spectrum.

In some examples, the transmitter module 930 may include at least one RF transmitter, such as at least one RF transmitter operable to transmit over the licensed spectrum and/or the shared spectrum. The transmitter module 930 may be used to transmit various types of data and/or control signals (i.e., transmissions) over one or more communication links of a wireless communication system, such as one or more communication links of the wireless communication system 100, 200, 300, 400, and/or 500 described with reference to FIG. 1, 2, 3, 4, and/or 5. The communication links may be established over the licensed spectrum and/or the shared spectrum.

In some examples, the wireless communication management module 920 may be used to manage one or more aspects of wireless communication for the apparatus 905. In some examples, the wireless communication management module 920 may include a reference signal transmission module 935 and/or a measurement reception module 940. Each of these components may be in communication with each other.

In some examples, the reference signal transmission module 935 may be used to transmit a reference signal over the shared spectrum to a UE. The reference signal may be transmitted via the transmitter module 930.

In some examples, the measurement reception module 940 may be used to receive a measurement of the reference signal from the UE. The measurement may indicate interference with the shared spectrum from outside of a CS range of the apparatus 905 (see, e.g., the CS range described with reference to FIG. 4 and/or 5). The measurement may be received via the receiver module 910.

In some examples, the reference signal transmission module 935 and measurement reception module 940 may perform their operations to collect measurements from a plurality of UEs.

Figure 10:
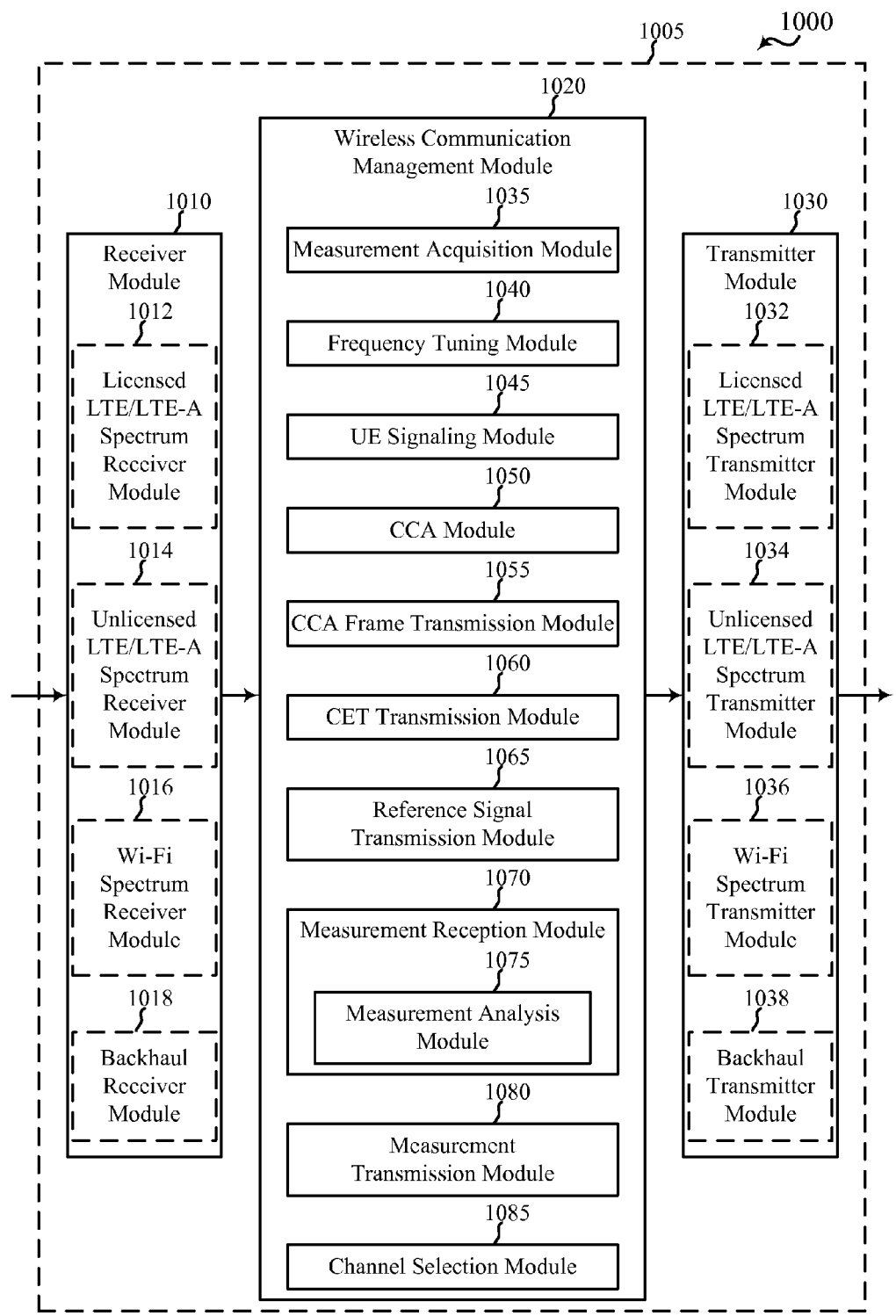
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the access points 105, 205, 205-a, 305-a, 305-b, 305-c, 305-d, 405, and/or 505 described with reference to FIG. 1, 2, 3, 4, and/or 5, and/or an example of aspects of the apparatus 905 described with reference to FIG. 9. The apparatus 1005 may in some examples be an LTE/LTE-A base station. The apparatus 1005 may also be a processor. The apparatus 1005 may include a receiver module 1010, a wireless communication management module 1020, and/or a transmitter module 1030. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may be an example of one or more aspects of the receiver module 910 described with reference to FIG. 9. In some examples, the receiver module 1010 may include at least one RF receiver, such as at least one RF receiver operable to receive transmissions over licensed spectrum (e.g., a radio frequency spectrum for which apparatuses do not contend for access because the radio frequency spectrum is licensed to particular users (e.g., LTE/LTE-A users) for particular uses) and/or a shared spectrum (e.g., a radio frequency spectrum for which apparatuses may need to contend for access because the radio frequency spectrum is available, at least in part, for unlicensed use (e.g., Wi-Fi use and/or unlicensed LTE/LTE-A use)). In some examples, the licensed spectrum and/or the shared spectrum may be used for LTE/LTE-A communications, as described, for example, with reference to FIG. 1, 2, 3, 4, and/or 5. The receiver module 1010 may in some cases include separate receivers for the licensed spectrum and the shared spectrum. The separate receivers may, in some examples, take the form of a licensed LTE/LTE-A spectrum receiver module 1012 for communicating over the licensed spectrum, and an unlicensed LTE/LTE-A spectrum receiver module 1014 for communicating over the shared spectrum. In some examples, the receiver module 1010 may also include a Wi-Fi spectrum receiver module 1016 and/or a backhaul receiver module 1018. The receiver module 1010, including the licensed LTE/LTE-A spectrum receiver module 1012, the unlicensed LTE/LTE-A spectrum receiver module 1014, the Wi-Fi spectrum receiver module 1016, and/or the backhaul receiver module 1018, may be used to receive various types of data and/or control signals (i.e., transmissions) over one or more communication links and/or backhaul links of a wireless communication system, such as one or more communication links and/or backhaul links of the wireless communication system 100, 200, 300, 400, and/or 500 described with reference to FIG. 1, 2, 3, 4, and/or 5. The communication links and/or backhaul links may be established over the licensed spectrum and/or the shared spectrum (and/or over one or more wired or wireless connections with, for example, a core network such as the core network 130 described with reference to FIG. 1).

In some examples, the transmitter module 1030 may be an example of one or more aspects of the transmitter module 930 described with reference to FIG. 9. In some examples, the transmitter module 1030 may include at least one RF transmitter, such as at least one RF transmitter operable to transmit over the licensed spectrum and/or the shared spectrum. The transmitter module 1030 may in some cases include separate transmitters for the licensed spectrum and the shared spectrum. The separate transmitters may, in some examples, take the form of a licensed LTE/LTE-A spectrum transmitter module 1032 for communicating over the licensed spectrum, and an unlicensed LTE/LTE-A spectrum transmitter module 1034 for communicating over the shared spectrum. In some examples, the transmitter module 1030 may also include a Wi-Fi spectrum transmitter module 1036 and/or a backhaul transmitter module 1038. The transmitter module 1030, including the licensed LTE/LTE-A spectrum transmitter module 1032, the unlicensed LTE/LTE-A spectrum transmitter module 1034, the Wi-Fi spectrum transmitter module 1036, and/or the backhaul transmitter module 1038, may be used to transmit various types of data and/or control signals (i.e., transmissions) over one or more communication links and/or backhaul links of a wireless communication system, such as one or more communication links and/or backhaul links of the wireless communication system 100, 200, 300, 400, and/or 500 described with reference to FIG. 1, 2, 3, 4, and/or 5. The communication links and/or backhaul links may be established over the licensed spectrum and/or the shared spectrum (and/or over one or more wired or wireless connections with, for example, a core network such as the core network 130 described with reference to FIG. 1).

In some examples, the wireless communication management module 1020 may be an example of one or more aspects of the wireless communication management module 920 described with reference to FIG. 9. The wireless communication management module 1020 may include a measurement acquisition module 1035, a frequency tuning module 1040, a UE signaling module 1045, a CCA module 1050, a CCA frame transmission module 1055, a CET transmission module 1060, a reference signal transmission module 1065, a measurement reception module 1070, a measurement transmission module 1080, and/or a channel selection module 1085. Each of these components may be in communication with each other.

In some examples, the measurement acquisition module 1035 may be used to determine whether to perform an intra-frequency measurement or an inter-frequency measurement. An intra-frequency measurement may be performed using a channel within the shared spectrum (e.g., a first channel within the shared spectrum) to which the apparatus 1005 is currently tuned, whereas an inter-frequency measurement may be performed using a different channel within the shared spectrum (e.g., a second channel within the shared spectrum).

In some examples, the frequency tuning module 1040 may be used to tune the apparatus 1005 from the first channel within the shared spectrum to the second channel within the shared spectrum. The frequency tuning module 1040 may also be used to tune the apparatus 1005 back to the first channel following the transmission of a reference signal over the second channel.

In some examples, the UE signaling module 1045 may be used to signal a transition to the second channel to a UE, prior to transmitting a reference signal over the second channel. The signaling may also indicate a need for the UE to perform a reference signal measurement during a transmission of a CCA frame.

In some examples, the CCA module 1050 be used to perform a CCA for the shared spectrum. The CCA may be performed to determine whether the shared spectrum is available to the apparatus 1005.

In some examples, the CCA frame transmission module 1055 may be used to determine whether a CCA performed by the CCA module 1050 was successful. When it is determined that the CCA was successful, the CCA frame transmission module 1055 may transmit a CCA frame (e.g., see the CCA frame described with reference to FIG. 8) including a reference signal (e.g., a CRS type of reference signal) over the shared spectrum to a UE. In some examples, the CCA frame may contain one or more reference signals but no data. The CCA frame may be transmitted via the unlicensed LTE/LTE-A spectrum transmitter module 1034.

In some examples, the CET transmission module 1060 may be used to transmit a CET from the apparatus 1005 over the shared spectrum to a UE. The CET may include a reference signal and/or an indication of whether a CCA performed by the CCA module 1050 was successful (see, e.g., the CET described with reference to FIG. 6 and/or 7). A CET may be transmitted immediately (or very soon after) performing a CCA. In this manner, the reference signal included in the CET (which CET may be sent regardless of whether the CCA was successful) may be made LBT compliant when the CCA is successful (e.g., when the CCA is successful, the CET may be assumed to be transmitted when interference from inside a CS range of the apparatus 1005 is below a threshold), and the reference signal may be measured for the purpose of determining an interference from outside the CS range of the apparatus 1005. In some examples, the indication of whether the CCA was successful may be encoded in a single bit indicating that the shared spectrum was CLEAR or BUSY. The CET may be transmitted via the unlicensed LTE/LTE-A spectrum transmitter module 1034.

In some examples, the reference signal transmission module 1065 may be an example of one or more aspects of the reference signal transmission module 935 described with reference to FIG. 9. In some examples, the reference signal transmission module 1065 may be used to transmit a reference signal over the shared spectrum to a UE. The reference signal may be transmitted by causing the reference signal to be included in a CCA frame transmitted by the CCA frame transmission module 1055 and/or in a CET transmitted by the CET transmission module 1060.

In some examples, the measurement reception module 1070 may be an example of one or more aspects of the measurement reception module 940 described with reference to FIG. 9. In some examples, the measurement reception module 1070 may be used to receive a measurement of the reference signal from the UE. The measurement of the reference signal may be received over one of the first channel and the second channel. The measurement may in some examples include an RSRP measurement and/or an RSRQ measurement. When a CCA corresponding to a reference signal for which the measurement was performed was successful, the measurement may indicate interference with the shared spectrum from outside of a CS range of the apparatus 1005 (see, e.g., the CS range described with reference to FIG. 4 and/or 5). The measurement of the reference signal may be received via the unlicensed LTE/LTE-A spectrum receiver module 1014.

In some examples, the measurement reception module 1070 may include a measurement analysis module 1075. In some examples, the measurement analysis module 1075 may be used to determine whether a CCA performed by the CCA module 1050 for a reference signal corresponding to a measurement of a reference signal was successful. When the measurement analysis module 1075 determines that the CCA was successful, the measurement analysis module 1075 may determine that the measurement of the reference signal indicates an interference from outside the CS range of the apparatus 1005. When the measurement analysis module 1075 determines that the CCA was not successful, the measurement analysis may indicate that only an RSRP measurement of the reference signal should be used for channel selection.

In some examples, the measurement transmission module 1080 may be used to transmit a measurement of a reference signal to at least one other apparatus. The measurement of the reference signal may in some examples be transmitted to the at least one other apparatus over a backhaul interface In some examples, the channel selection module 1085 may be used to determine a channel selection for the apparatus 1005 based at least in part on a measurement of a reference signal. In some examples, the channel selection module 1085 may be used to determine whether a local channel selection or a remote channel selection is to be performed for the apparatus 1005. When it is determined that a local channel selection is to be performed, the channel selection module 1085 may perform a channel selection for the apparatus 1005 based at least in part on a measurement of a reference signal. When it is determined that a remote channel selection is to be performed, the channel selection module 1085 may be used to receive a channel selection for the apparatus 1005. The received channel selection may be based at least in part on a measurement of a reference signal. The channel selection may in some examples be received over a backhaul interface.

In some examples, the modules of the apparatus 1005 may perform their operations to collect measurements from a plurality of UEs.

Figure 11:
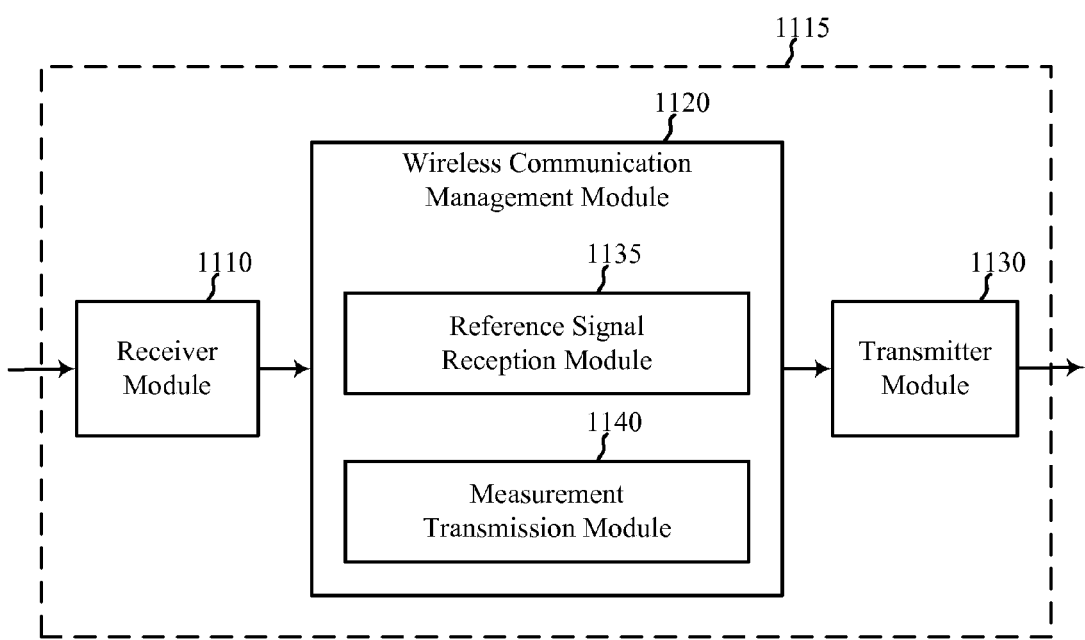
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. In some examples, the apparatus 1115 may be an example of aspects of one or more of the UEs 115, 215, 215-*a*, 215-*b*, 215-*c*, 315, 415, and/or 515 described with reference to FIG. 1, 2, 3, 4, and/or 5. The apparatus 1115 may also be a processor. The apparatus 1115 may include a receiver module 1110, a wireless communication management module 1120, and/or a transmitter module 1130. Each of these components may be in communication with each other.

The components of the apparatus 1115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may include at least one RF receiver, such as at least one RF receiver operable to receive transmissions over a licensed spectrum (e.g., a radio frequency spectrum for which apparatuses do not contend for access because the radio frequency spectrum is licensed to particular users (e.g., LTE/LTE-A users) for particular uses) and/or a shared spectrum (e.g., a radio frequency spectrum for which apparatuses may need to contend for access because the radio frequency spectrum is available, at least in part, for unlicensed use (e.g., Wi-Fi use and/or unlicensed LTE/LTE-A use)). In some examples, the licensed spectrum and/or the shared spectrum may be used for LTE/LTE-A communications, as described, for example, with reference to FIG. 1, 2, 3, 4, and/or 5. The receiver module 1110 may be used to receive various types of data and/or control signals (i.e., transmissions) over one or more communication links of a wireless communication system, such as one or more communication links of the wireless communication system 100, 200, 300, 400, and/or 500 described with reference to FIG. 1, 2, 3, 4, and/or 5. The communication links may be established over the licensed spectrum and/or the shared spectrum.

In some examples, the transmitter module 1130 may include at least one RF transmitter, such as at least one RF transmitter operable to transmit over the licensed spectrum and/or the shared spectrum. The transmitter module 1130 may be used to transmit various types of data and/or control signals (i.e., transmissions) over one or more communication links of a wireless communication system, such as one or more communication links of the wireless communication system 100, 200, 300, 400, and/or 500 described with reference to FIG. 1, 2, 3, 4, and/or 5. The communication links may be established over the licensed spectrum and/or the shared spectrum.

In some examples, the wireless communication management module 1120 may be used to manage one or more aspects of wireless communication for the apparatus 1115. In some examples, the wireless communication management module 1120 may include a reference signal reception module 1135 and/or a measurement transmission module 1140. Each of these components may be in communication with each other.

In some examples, the reference signal reception module 1135 may be used to receive a reference signal transmitted by an access point over the shared spectrum. The access point may in some examples be an LTE/LTE-A base station. The reference signal may be received via the receiver module 1110.

In some examples, the measurement transmission module 1140 may be used to transmit a measurement of the reference signal to the access point. The measurement may indicate interference with the shared spectrum from outside of a CS range of the access point (see, e.g., the CS range described with reference to FIG. 4 and/or 5). The measurement may be transmitted via the transmitter module 1130.

Figure 12:
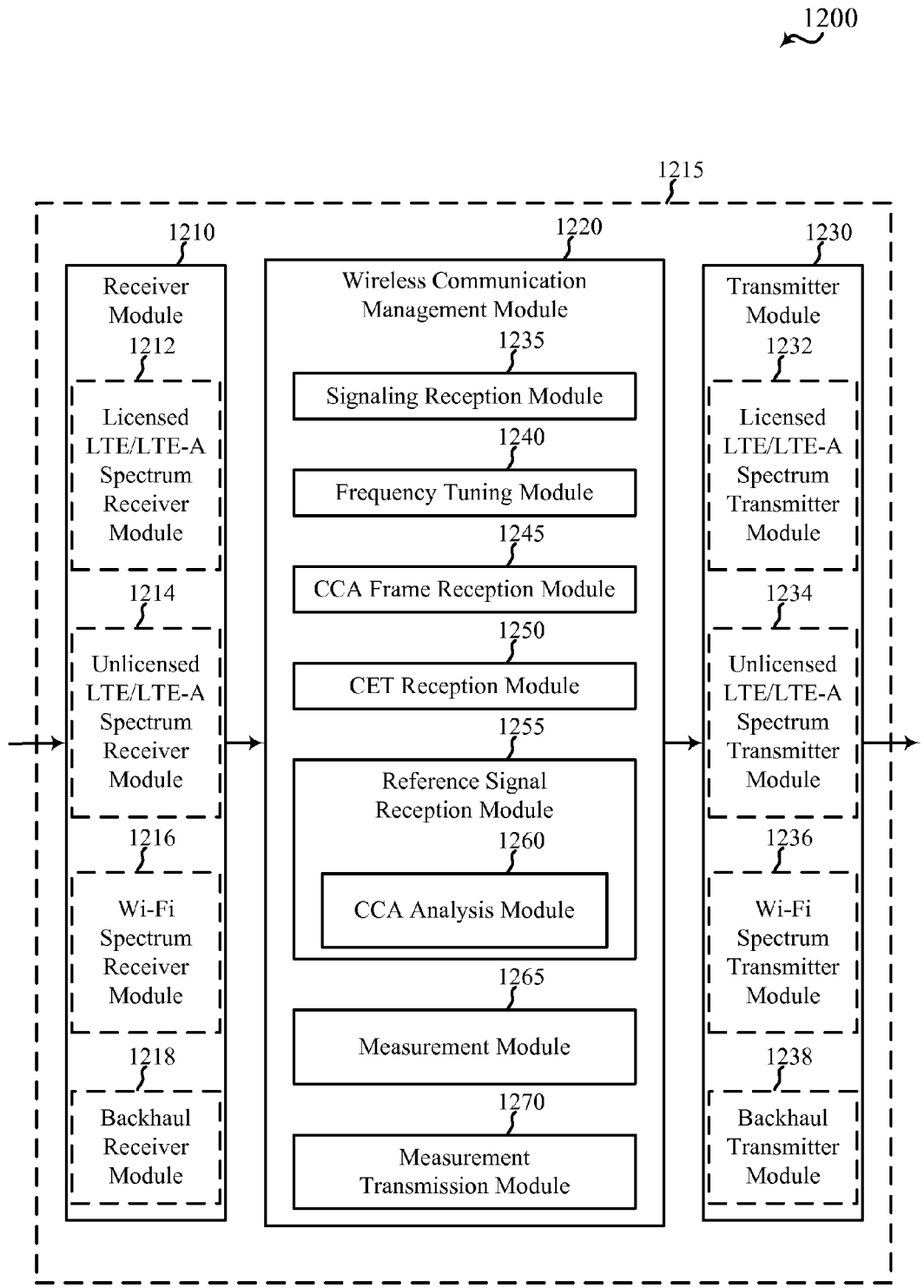
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. In some examples, the apparatus 1215 may be an example of aspects of one or more of the UEs 115, 215, 215-*a*, 215-*b*, 215-*c*, 315, 415, and/or 515 described with reference to FIG. 1, 2, 3, 4, and/or 5, and/or an example of aspects of the apparatus 1115 described with reference to FIG. 11. The apparatus 1215 may also be a processor. The apparatus 1215 may include a receiver module 1210, a wireless communication management module 1220, and/or a transmitter module 1230. Each of these components may be in communication with each other.

The components of the apparatus 1215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may be an example of one or more aspects of the receiver module 1110 described with reference to FIG. 11. In some examples, the receiver module 1210 may include at least one RF receiver, such as at least one RF receiver operable to receive transmissions over licensed spectrum (e.g., a radio frequency spectrum for which apparatuses do not contend for access because the radio frequency spectrum is licensed to particular users (e.g., LTE/LTE-A users) for particular uses) and/or a shared spectrum (e.g., a radio frequency spectrum for which apparatuses may need to contend for access because the radio frequency spectrum is available, at least in part, for unlicensed use (e.g., Wi-Fi use and/or unlicensed LTE/LTE-A use)). In some examples, the licensed spectrum and/or the shared spectrum may be used for LTE/LTE-A communications, as described, for example, with reference to FIG. 1, 2, 3, 4, and/or 5. The receiver module 1210 may in some cases include separate receivers for the licensed spectrum and the shared spectrum. The separate receivers may, in some examples, take the form of a licensed LTE/LTE-A spectrum receiver module 1212 for communicating over the licensed spectrum, and an unlicensed LTE/LTE-A spectrum receiver module 1214 for communicating over the shared spectrum. In some examples, the receiver module 1210 may also include a Wi-Fi spectrum receiver module 1216 and/or a backhaul receiver module 1218. The receiver module 1210, including the licensed LTE/LTE-A spectrum receiver module 1212, the unlicensed LTE/LTE-A spectrum receiver module 1214, the Wi-Fi spectrum receiver module 1216, and/or the backhaul receiver module 1218 may be used to receive various types of data and/or control signals (i.e., transmissions) over one or more communication links and/or backhaul links of a wireless communication system, such as one or more communication links and/or backhaul links of the wireless communication system 100, 200, 300, 400, and/or 500 described with reference to FIG. 1, 2, 3, 4, and/or 5. The communication links and/or backhaul links may be established over the licensed spectrum and/or the shared spectrum (and/or over one or more wired or wireless connections with, for example, a core network such as the core network 130 described with reference to FIG. 1).

In some examples, the transmitter module 1230 may be an example of one or more aspects of the transmitter module 1130 described with reference to FIG. 11. In some examples, the transmitter module 1230 may include at least one RF transmitter, such as at least one RF transmitter operable to transmit over the licensed spectrum and/or the shared spectrum. The transmitter module 1230 may in some cases include separate transmitters for the licensed spectrum and the shared spectrum. The separate transmitters may, in some examples, take the form of a licensed LTE/LTE-A spectrum transmitter module 1232 for communicating over the licensed spectrum, and an unlicensed LTE/LTE-A spectrum transmitter module 1234 for communicating over the shared spectrum. In some examples, the transmitter module 1230 may also include a Wi-Fi spectrum transmitter module 1236 and/or a backhaul transmitter module 1238. The transmitter module 1230, including the licensed LTE/LTE-A spectrum transmitter module 1232, the unlicensed LTE/LTE-A spectrum transmitter module 1234, the Wi-Fi spectrum transmitter module 1236, and/or the backhaul transmitter module 1238 may be used to transmit various types of data and/or control signals (i.e., transmissions) over one or more communication links and/or backhaul links of a wireless communication system, such as one or more communication links and/or backhaul links of the wireless communication system 100, 200, 300, 400, and/or 500 described with reference to FIG. 1, 2, 3, 4, and/or 5. The communication links and/or backhaul links may be established over the licensed spectrum and/or the shared spectrum (and/or over one or more wired or wireless connections with, for example, a core network such as the core network 130 described with reference to FIG. 1).

In some examples, the wireless communication management module 1220 may be an example of one or more aspects of the wireless communication management module 1120 described with reference to FIG. 11. The wireless communication management module 1220 may include a signaling reception module 1235, a frequency tuning module 1240, a CCA frame reception module 1245, a CET reception module 1250, a reference signal reception module 1255, a measurement module 1265, and/or a measurement transmission module 1270. Each of these components may be in communication with each other.

In some examples, the signaling reception module 1235 may be used to receive signaling indicating a transition from a first channel within a shared spectrum to a second channel within the shared spectrum. The signaling may also indicate a need for the apparatus 1215 to perform a reference signal measurement during reception of a CCA frame.

In some examples, the frequency tuning module 1240 may be used to tune the apparatus 1215 from the first channel within the shared spectrum to the second channel within the shared spectrum. In some examples, the tuning of the apparatus 1215 to the second channel may occur in response to the signaling. The frequency tuning module 1240 may also tune the apparatus 1215 back to the first channel following receipt of a reference signal.

In some examples, the CCA frame reception module 1245 may be used to receive a CCA frame including a reference signal (e.g., a CRS type of reference signal). The CCA frame may be received over the shared spectrum from an access point. The access point may in some examples be an LTE/LTE-A base station. The CCA frame may be received via the unlicensed LTE/LTE-A spectrum receiver module 1214.

In some examples, the CET reception module 1250 may be used to receive a CET over a shared spectrum from an access point. The CET may include a reference signal and/or an indication of whether a CCA performed by the access point before transmission of the CET was successful (see, e.g., the CET described with reference to FIG. 6 and/or 7). The access point may in some examples be an LTE/LTE-A base station. The CET may be received via the unlicensed LTE/LTE-A spectrum receiver module 1214.

In some examples, the reference signal reception module 1255 may be an example of one or more aspects of the reference signal reception module 1135 described with reference to FIG. 11. In some examples, the reference signal reception module 1255 may be used to receive a reference signal transmitted by an access point over the shared spectrum.

In some examples, the reference signal reception module 1255 may include a CCA analysis module 1260. In some examples, the CCA analysis module 1260 may be used to determine whether a CCA performed by an access point before transmission of a CET was successful. The determination may be based at least in part on the CET. When it is determined that the CCA was successful, a measurement of a received reference signal corresponding to the successful CCA may indicate interference from outside of a CS range of the access point (see, e.g., the CS range described with reference to FIG. 4 and/or 5). When it is determined that the CCA was not successful, only an RSRP measurement of the reference signal corresponding to the CCA may be useful. In some examples, it may be determined whether the CCA was successful by determining the state of a single bit.

In some examples, the measurement module 1265 may be used to measure the reference signal to produce a measurement of the reference signal. The measurement may in some examples include an RSRP measurement and/or an RSRQ measurement.

In some examples, the measurement transmission module 1270 may be an example of one or more aspects of the measurement transmission module 1140 described with reference to FIG. 11. In some examples, the measurement transmission module 1270 may be used to transmit a measurement of the reference signal to the access point. In some examples, the measurement transmission module 1270 may determine whether the measurement of the reference signal should be transmitted over one of a first channel or a second channel. The measurement may be transmitted via the unlicensed LTE/LTE-A spectrum transmitter module 1234.

Figure 13:
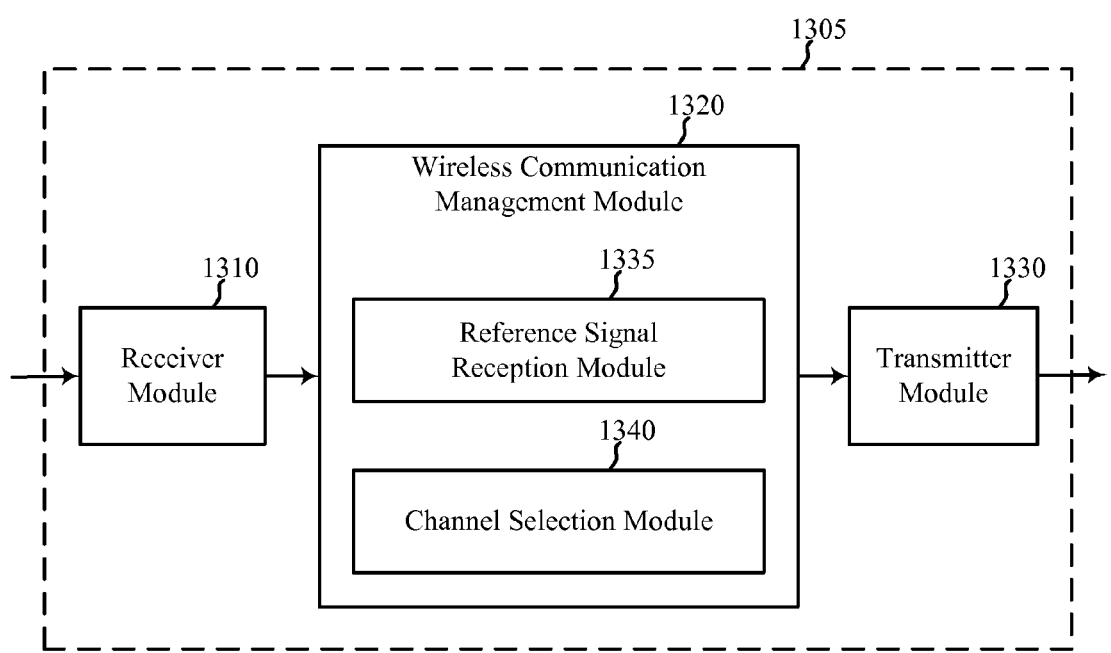
FIG. 13 shows a block diagram of an apparatus for use in wireless communication, in accordance with various aspects of the present disclosure.

FIG. 13 shows a block diagram 1300 of an apparatus 1305 for use in wireless communication, in accordance with various aspects of the present disclosure. In some examples, the apparatus 1305 may be an example of aspects of one or more of the access points 105, 205, 205-*a*, 305-*a*, 305-*b*, 305-*c*, 305-*d*, 405-*a*, and/or 505-*a* described with reference to FIG. 1, 2, 3, 4, and/or 5, and/or an example of aspects of the core network 130 described with reference to FIG. 1. In examples in which the apparatus 1305 is an access point, the apparatus 1305 may in some examples be an LTE/LTE-A base station. The apparatus 1305 may also be a processor. The apparatus 1305 may include a receiver module 1310, a wireless communication management module 1320, and/or a transmitter module 1330. Each of these components may be in communication with each other.

The components of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may include at least one RF receiver, such as at least one RF receiver operable to receive transmissions over a licensed spectrum (e.g., a radio frequency spectrum for which apparatuses do not contend for access because the radio frequency spectrum is licensed to particular users (e.g., LTE/LTE-A users) for particular uses), a shared spectrum (e.g., a radio frequency spectrum for which apparatuses may need to contend for access because the radio frequency spectrum is available, at least in part, for unlicensed use (e.g., Wi-Fi use and/or unlicensed LTE/LTE-A use)), and/or a backhaul interface. In some examples, the licensed spectrum and/or the shared spectrum may be used for LTE/LTE-A communications, as described, for example, with reference to FIG. 1, 2, 3, 4, and/or 5. The receiver module 1310 may be used to receive various types of data and/or control signals (i.e., transmissions) over one or more communication links and/or backhaul links of a wireless communication system, such as one or more communication links and/or backhaul links of the wireless communication system 100, 200, 300, 400, and/or 500 described with reference to FIG. 1, 2, 3, 4, and/or 5. The communication links and/or backhaul links may be established over the licensed spectrum and/or the shared spectrum (and/or over one or more wired or wireless connections with, for example, a core network such as the core network 130 described with reference to FIG. 1).

In some examples, the transmitter module 1330 may include at least one RF transmitter, such as at least one RF transmitter operable to transmit over the licensed spectrum, the shared spectrum, and/or the backhaul interface. The transmitter module 1330 may be used to transmit various types of data and/or control signals (i.e., transmissions) over one or more communication links and/or backhaul links of a wireless communication system, such as one or more communication links and/or backhaul links of the wireless communication system 100, 200, 300, 400, and/or 500 described with reference to FIG. 1, 2, 3, 4, and/or 5. The communication links and/or backhaul links may be established over the licensed spectrum and/or the shared spectrum (and/or over one or more wired or wireless connections with, for example, a core network such as the core network 130 described with reference to FIG. 1).

In some examples, the wireless communication management module 1320 may be used to manage one or more aspects of wireless communication for the apparatus 1305. In some examples, the wireless communication management module 1320 may include a reference signal reception module 1335 and/or a channel selection module 1340. Each of these components may be in communication with each other.

In some examples, the reference signal reception module 1335 may be used to receive a plurality of reference signal measurements. Each reference signal measurement may correspond to one of a plurality of access points and may indicate interference with the shared spectrum from outside of a CS range of the corresponding access point (see, e.g., the CS range described with reference to FIG. 4 and/or 5). In some examples, at least a portion of the plurality of reference signal measurements may be received over a backhaul interface.

In some examples, the channel selection module 1340 may be used to perform channel selection for the plurality of access points based at least in part on the received reference signal measurements.

Figure 14:
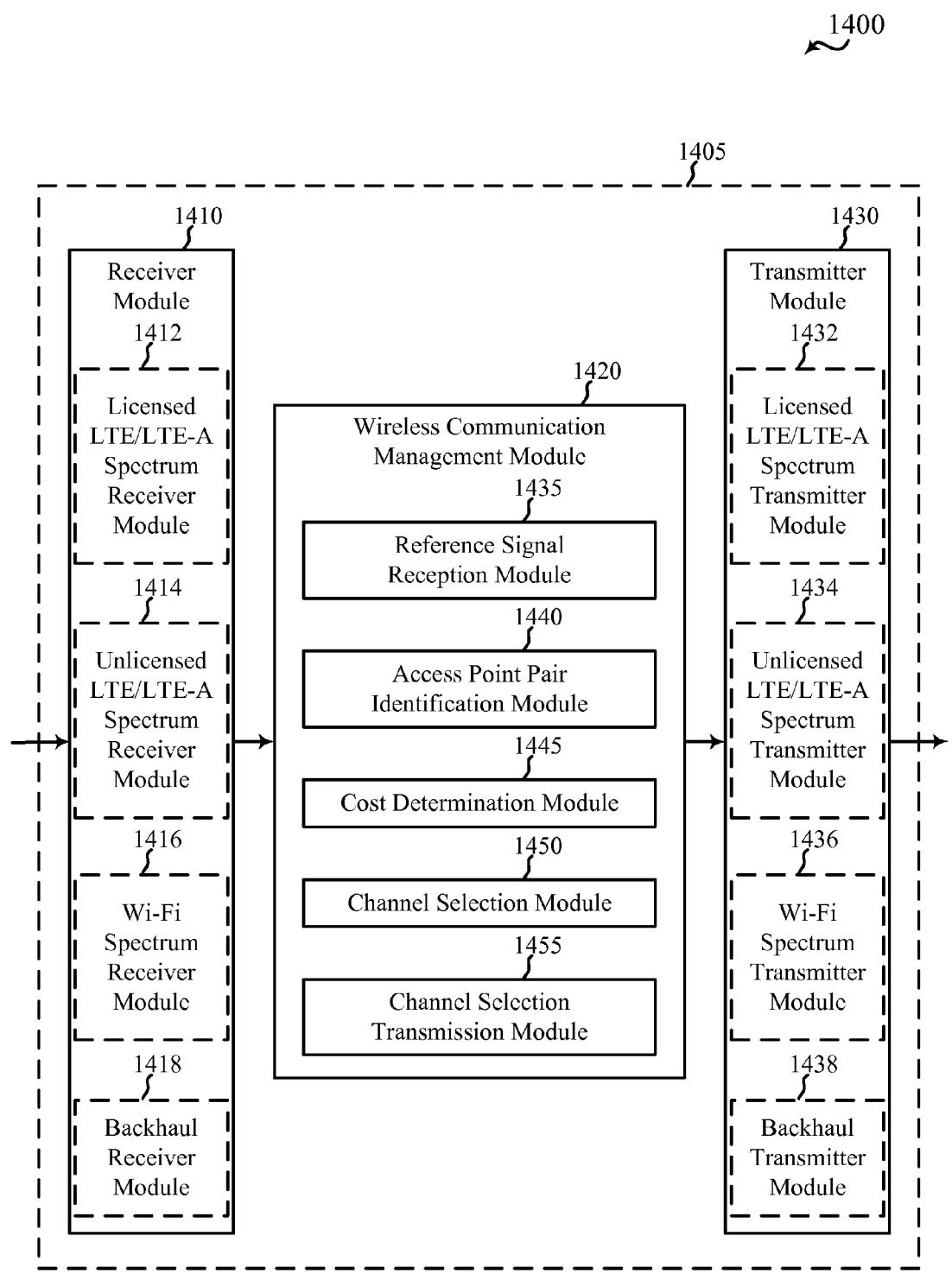
FIG. 14 shows a block diagram of an apparatus for use in wireless communication, in accordance with various aspects of the present disclosure.

FIG. 14 shows a block diagram 1400 of an apparatus 1405 for use in wireless communication, in accordance with various aspects of the present disclosure. In some examples, the apparatus 1405 may be an example of aspects of one or more of the access points 105, 205, 205-*a*, 305-*a*, 305-*b*, 305-*c*, 305-*d*, 405-*a*, and/or 505-*a* described with reference to FIG. 1, 2, 3, 4, and/or 5, and/or an example of aspects of the core network 130 described with reference to FIG. 1, and/or an example of aspects of the apparatus 1425 described with reference to FIG. 13. In examples in which the apparatus 1405 is an access point, the apparatus 1405 may in some examples be an LTE/LTE-A base station. The apparatus 1405 may also be a processor. The apparatus 1405 may include a receiver module 1410, a wireless communication management module 1420, and/or a transmitter module 1430. Each of these components may be in communication with each other.

The components of the apparatus 1405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1410 may be an example of one or more aspects of the receiver module 1310 described with reference to FIG. 13. In some examples, the receiver module 1410 may include at least one RF receiver, such as at least one RF receiver operable to receive transmissions over licensed spectrum (e.g., a radio frequency spectrum for which apparatuses do not contend for access because the radio frequency spectrum is licensed to particular users (e.g., LTE/LTE-A users) for particular uses) and/or a shared spectrum (e.g., a radio frequency spectrum for which apparatuses may need to contend for access because the radio frequency spectrum is available, at least in part, for unlicensed use (e.g., Wi-Fi use and/or unlicensed LTE/LTE-A use)). In some examples, the licensed spectrum and/or the shared spectrum may be used for LTE/LTE-A communications, as described, for example, with reference to FIG. 1, 2, 3, 4, and/or 5. The receiver module 1410 may in some cases include separate receivers for the licensed spectrum and the shared spectrum. The separate receivers may, in some examples, take the form of a licensed LTE/LTE-A spectrum receiver module 1412 for communicating over the licensed spectrum, and an unlicensed LTE/LTE-A spectrum receiver module 1414 for communicating over the shared spectrum. In some examples, the receiver module 1410 may also include a Wi-Fi spectrum receiver module 1416 and/or a backhaul receiver module 1418. The receiver module 1410, including the licensed LTE/LTE-A spectrum receiver module 1412, the unlicensed LTE/LTE-A spectrum receiver module 1414, the Wi-Fi spectrum receiver module 1416, and/or the backhaul receiver module 1418 may be used to receive various types of data and/or control signals (i.e., transmissions) over one or more communication links and/or backhaul links of a wireless communication system, such as one or more communication links and/or backhaul links of the wireless communication system 100, 200, 300, 400, and/or 500 described with reference to FIG. 1, 2, 3, 4, and/or 5. The communication links and/or backhaul links may be established over the licensed spectrum and/or the shared spectrum (and/or over one or more wired connections with, for example, a core network such as the core network 130 described with reference to FIG. 1).

In some examples, the transmitter module 1430 may be an example of one or more aspects of the transmitter module 1330 described with reference to FIG. 13. In some examples, the transmitter module 1430 may include at least one RF transmitter, such as at least one RF transmitter operable to transmit over the licensed spectrum and/or the shared spectrum. The transmitter module 1430 may in some cases include separate transmitters for the licensed spectrum and the shared spectrum. The separate transmitters may, in some examples, take the form of a licensed LTE/LTE-A spectrum transmitter module 1432 for communicating over the licensed spectrum, and an unlicensed LTE/LTE-A spectrum transmitter module 1434 for communicating over the shared spectrum. In some examples, the transmitter module 1430 may also include a Wi-Fi spectrum transmitter module 1436 and/or a backhaul transmitter module 1438. The transmitter module 1430, including the licensed LTE/LTE-A spectrum transmitter module 1432, the unlicensed LTE/LTE-A spectrum transmitter module 1434, the Wi-Fi spectrum transmitter module 1436, and/or the backhaul transmitter module 1438 may be used to transmit various types of data and/or control signals (i.e., transmissions) over one or more communication links and/or backhaul links of a wireless communication system, such as one or more communication links and/or backhaul links of the wireless communication system 100, 200, 300, 400, and/or 500 described with reference to FIG. 1, 2, 3, 4, and/or 5. The communication links and/or backhaul links may be established over the licensed spectrum and/or the shared spectrum (and/or over one or more wired connections with, for example, a core network such as the core network 130 described with reference to FIG. 1).

In some examples, the wireless communication management module 1420 may be an example of one or more aspects of the wireless communication management module 1320 described with reference to FIG. 13. The wireless communication management module 1420 may include a reference signal reception module 1435, an access point pair identification module 1440, a cost determination module 1445, a channel selection module 1450, and/or a channel selection transmission module 1455. Each of these components may be in communication with each other.

In some examples, the reference signal reception module 1435 may be an example of one or more aspects of the reference signal reception module 1335 described with reference to FIG. 13. In some examples, the reference signal reception module 1435 may be used to receive a plurality of reference signal measurements. Each reference signal measurement may correspond to one of a plurality of access points and may indicate interference with the shared spectrum from outside of a CS range of the corresponding access point (see, e.g., the CS range described with reference to FIG. 4 and/or 5). In some examples, at least a portion of the plurality of reference signal measurements may be received over a backhaul interface (e.g., via the backhaul receiver module 1418).

In some examples, the access point pair identification module 1440 may be used to identify at least one pair of access points, from the plurality of access points, such that the access points of each identified pair of access points are within CS range of each other. In some examples, at least one pair of access points may be identified such that the MAC scheme associated with the at least one pair of access points includes one of Frequency Re-use 1 or time domain multiplexing.

In some examples, the cost determination module 1445 may be used to determine a cost associated with each identified pair of access points based at least in part on the received plurality of reference signal measurements. In some examples, the cost associated with each identified pair of access points may be further based at least in part on whether the access points of the pair of access points currently operate on the same channel. In some examples, the cost associated with each identified pair of access points may be further based at least in part on a MAC scheme associated with the pair of access points. In some examples, the cost associated with each identified pair of access points may be further based at least in part on whether one or more access points of the pair of access points operate within a dynamic frequency scaling or radar channel.

In some examples, the channel selection module 1450 may be an example of one or more aspects of the channel selection module 1340 described with reference to FIG. 13. In some examples, the channel selection module 1450 may be used to perform channel selection for the plurality of access points based at least in part on the received reference signal measurements. In some examples, the channel selection module 1450 may perform channel selection for the plurality of access points by selecting a channel for each of the access points that minimizes an aggregate cost associated with the identified at least one pair of access points.

In some examples, the channel selection transmission module 1455 may be used to transmit the channel selection to the plurality of access points. In some examples, the channel selection may be transmitted over at least one backhaul interface (e.g., via the backhaul transmitter module 1438).

Figure 15:
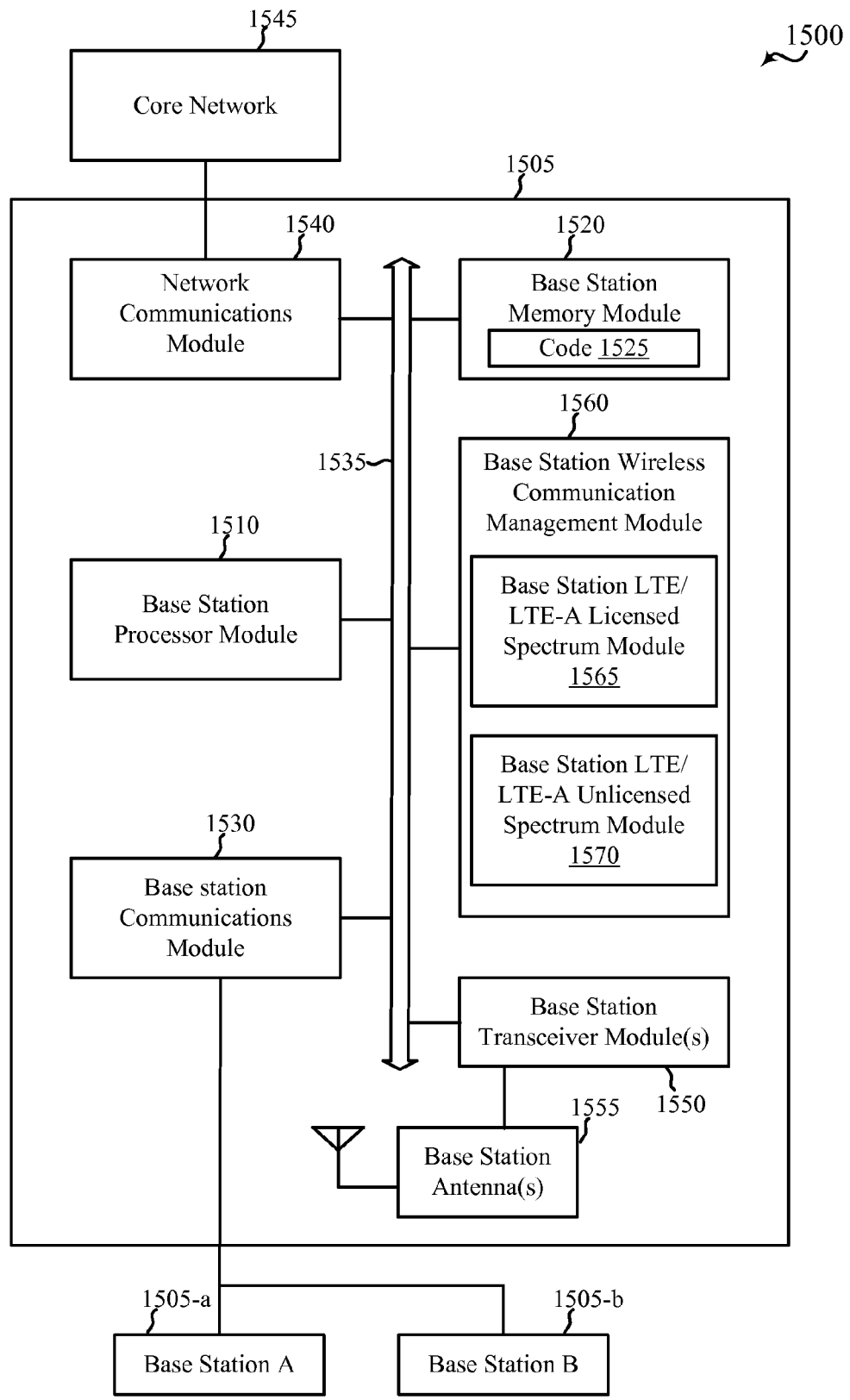
FIG. 15 shows a block diagram of a base station (e.g., a base station forming part or all of an evolved NodeB (eNB)) for use in wireless communication, in accordance with various aspects of the present disclosure.

FIG. 15 shows a block diagram 1500 of a base station 1505 (e.g., a base station forming part or all of an eNB) for use in wireless communication, in accordance with various aspects of the present disclosure. In some examples, the base station 1505 may be an example of one or more aspects of the access point 105, 205, 205-*a*, 305-*a*, 305-*b*, 305-*c*, 305-*d*, 405-*a*, and/or 505-*a* described with reference to FIG. 1, 2, 3, 4, and/or 5, and/or one or more aspects of the apparatus 905, 1005, 1305, and/or 1405 described with reference to FIG. 9, 10, 13, and/or 14. The base station 1505 may be configured to implement or facilitate at least some of the access point and/or apparatus features and functions described with reference to FIG. 1, 2, 3, 4, 5, 6, 7, 8, 9, 10, 13, and/or 14.

The base station 1505 may include a base station processor module 1510, a base station memory module 1520, at least one base station transceiver module (represented by base station transceiver module(s) 1550), at least one base station antenna (represented by base station antenna(s) 1555), and/or a base station wireless communication management module 1560. The base station 1505 may also include one or more of a base station communications module 1530 and/or a network communications module 1540. Each of these components may be in communication with each other, directly or indirectly, over one or more buses 1535.

The base station memory module 1520 may include random access memory (RAM) and/or read-only memory (ROM). The base station memory module 1520 may store computer-readable, computer-executable code 1525 containing instructions that are configured to, when executed, cause the base station processor module 1510 to perform various functions described herein related to wireless communication (e.g., reference signal transmission, measurement reception, and/or channel selection). Alternatively, the code 1525 may not be directly executable by the base station processor module 1510 but be configured to cause the base station 1505 (e.g., when compiled and executed) to perform various of the functions described herein.

The base station processor module 1510 may include an intelligent hardware device, e.g., a central processing unit (CPU), a microcontroller, an ASIC, etc. The base station processor module 1510 may process information received through the base station transceiver module(s) 1550, the base station communications module 1530, and/or the network communications module 1540. The base station processor module 1510 may also process information to be sent to the transceiver module(s) 1550 for transmission through the antenna(s) 1555, to the base station communications module 1530, for transmission to one or more other base stations 1505-*a* and 1505-*b*, and/or to the network communications module 1540 for transmission to a core network 1545, which may be an example of one or more aspects of the core network 130 described with reference to FIG. 1. The base station processor module 1510 may handle, alone or in connection with the base station wireless communication management module 1560, various aspects of communicating over (or managing communications over) a first spectrum (e.g., a radio frequency spectrum for which apparatuses do not contend for access because the radio frequency spectrum is licensed to particular users for particular uses, such as a licensed radio frequency spectrum usable for LTE/LTE-A communications) and/or a second spectrum (e.g., a radio frequency spectrum for which apparatuses may need to contend for access because the radio frequency spectrum is available, at least in part, for unlicensed use, such as Wi-Fi use and/or unlicensed LTE/LTE-A use).

The base station transceiver module(s) 1550 may include a modem configured to modulate packets and provide the modulated packets to the base station antenna(s) 1555 for transmission, and to demodulate packets received from the base station antenna(s) 1555. The base station transceiver module(s) 1550 may, in some examples, be implemented as one or more base station transmitter modules and one or more separate base station receiver modules. The base station transceiver module(s) 1550 may support communications in the first spectrum and/or the second spectrum. The base station transceiver module(s) 1550 may be configured to communicate bi-directionally, via the antenna(s) 1555, with one or more UEs or apparatuses, such as one or more of the UEs 115, 215, 215-a, 215-b, 215-c, 315, 415, and/or 515 described with reference to FIG. 1, 2, 3, 4, and/or 5, and/or one or more of the apparatuses 1115 and/or 1215. The base station 1505 may, for example, include multiple base station antennas 1555 (e.g., an antenna array). The base station 1505 may communicate with the core network 1545 through the network communications module 1540. The base station 1505 may also communicate with other base stations, such as the base stations 1505-a and 1505-b, using the base station communications module 1530.

The base station wireless communication management module 1560 may be configured to perform and/or control some or all of the features and/or functions described with reference to FIG. 1, 2, 3, 4, 5, 6, 7, 8, 9, 10, 13, and/or 14 related to wireless communication (e.g., reference signal transmission, measurement reception, and/or channel selection) over the first spectrum and/or the second spectrum. For example, the base station wireless communication management module 1560 may be configured to support a supplemental downlink mode, a carrier aggregation mode, and/or a standalone mode using the first spectrum and/or the second spectrum. The base station wireless communication management module 1560 may include a base station LTE/LTE-A module for licensed spectrum 1565 configured to handle LTE/LTE-A communications in the first spectrum, and a base station LTE/LTE-A module for unlicensed spectrum 1570 configured to handle LTE/LTE-A communications in the second spectrum. The base station wireless communication management module 1560, or portions of it, may include a processor, and/or some or all of the functions of the base station wireless communication management module 1560 may be performed by the base station processor module 1510 and/or in connection with the base station processor module 1510. In some examples, the base station wireless communication management module 1560 may be an example of the wireless communication management module 920 and/or 1020 described with reference to FIG. 9 and/or 10.

Figure 16:
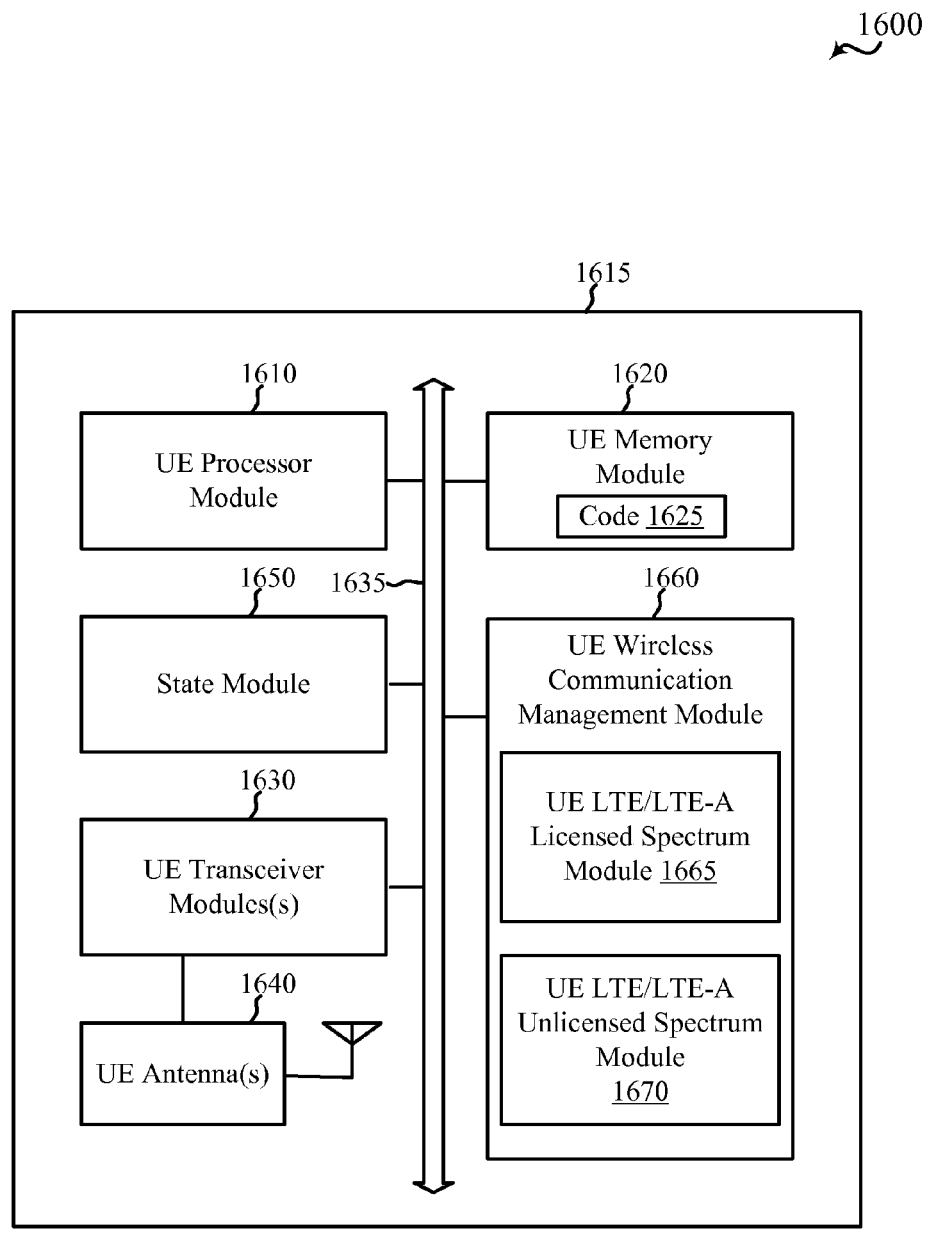
FIG. 16 shows a block diagram of a user equipment (UE) for use in wireless communication, in accordance with various aspects of the present disclosure.

FIG. 16 shows a block diagram 1600 of a UE 1615 for use in wireless communication, in accordance with various aspects of the present disclosure. The UE 1615 may have various configurations and may be or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1615 may, in some examples, have an internal power supply (not shown), such as a small battery, to facilitate mobile operation. In some examples, the UE 1615 may be an example of one or more aspects of the UE 115, 215, 215-a, 215-b, 215-c, 315, 415, and/or 515 described with reference to FIG. 1, 2, 3, 4, and/or 5, and/or one or more aspects of the apparatus 1115 and/or 1215 described with reference to FIG. 11 and/or 12. The UE 1615 may be configured to implement at least some of the UE and/or apparatus features and functions described with reference to FIG. 1, 2, 3, 4, 5, 6, 7, 8, 11, and/or 12.

The UE 1615 may include a UE processor module 1610, a UE memory module 1620, at least one UE transceiver module (represented by UE transceiver module(s) 1630), at least one UE antenna (represented by UE antenna(s) 1640), and/or a UE wireless communication management module 1660. Each of these components may be in communication with each other, directly or indirectly, over one or more buses 1635.

The UE memory module 1620 may include RAM and/or ROM. The UE memory module 1620 may store computer-readable, computer-executable code 1625 containing instructions that are configured to, when executed, cause the UE processor module 1610 to perform various functions described herein related to wireless communication (e.g., reference signal reception, reference signal measurement, and/or measurement transmission). Alternatively, the code 1625 may not be directly executable by the UE processor module 1610 but be configured to cause the UE 1615 (e.g., when compiled and executed) to perform various aspects of the functions described herein.

The UE processor module 1610 may include an intelligent hardware device, e.g., a CPU, a microcontroller, an ASIC, etc. The UE processor module 1610 may process information received through the UE transceiver module(s) 1630 and/or information to be sent to the UE transceiver module(s) 1630 for transmission through the UE antenna(s) 1640. The UE processor module 1610 may handle, alone or in connection with the UE wireless communication management module 1660, various aspects of communicating over (or managing communications over) a first spectrum (e.g., a radio frequency spectrum for which apparatuses do not contend for access because the radio frequency spectrum is licensed to particular users for particular uses, such as a licensed radio frequency spectrum usable for LTE/LTE-A communications) and/or a second spectrum (e.g., a radio frequency spectrum for which apparatuses may need to contend for access because the radio frequency spectrum is available, at least in part, for unlicensed use, such as Wi-Fi use and/or unlicensed LTE/LTE-A use).

The UE transceiver module(s) 1630 may include a modem configured to modulate packets and provide the modulated packets to the UE antenna(s) 1640 for transmission, and to demodulate packets received from the UE antenna(s) 1640. The UE transceiver module(s) 1630 may, in some examples, be implemented as one or more UE transmitter modules and one or more separate UE receiver modules. The UE transceiver module(s) 1630 may support communications in the first spectrum and/or the second spectrum. The UE transceiver module(s) 1630 may be configured to communicate bi-directionally, via the UE antenna(s) 1640, with one or more of the access points 105, 205, 205-a, 305-a, 305-b, 305-c, 305-d, 405, 505, and/or 1505 described with reference to FIG. 1, 2, 3, 4, 5, and/or 15, and/or the apparatus 905 and/or 1005 described with reference to FIG. 9 and/or 10. While the UE 1615 may include a single UE antenna, there may be examples in which the UE 1615 may include multiple UE antennas 1640.

The UE state module 1650 may be used, for example, to manage transitions of the UE 1615 between an RRC idle state and an RRC connected state, and may be in communication with other components of the UE 1615, directly or indirectly, over the one or more buses 1635. The UE state module 1650, or portions of it, may include a processor, and/or some or all of the functions of the UE state module 1650 may be performed by the UE processor module 1610 and/or in connection with the UE processor module 1610.

The UE wireless communication management module 1660 may be configured to perform and/or control some or all of the features and/or functions described with reference to FIG. 1, 2, 3, 4, 5, 6, 7, 8, 11, and/or 12 related to wireless communication (e.g., reference signal reception, reference signal measurement, and/or measurement transmission) over the first spectrum and/or the second spectrum. For example, the UE wireless communication management module 1660 may be configured to support a supplemental downlink mode, a carrier aggregation mode, and/or a stand-alone mode using the first spectrum and/or the second spectrum. The UE wireless communication management module 1660 may include a UE LTE/LTE-A module for licensed spectrum 1665 configured to handle LTE/LTE-A communications in the first spectrum, and a UE LTE/LTE-A module for unlicensed spectrum 1670 configured to handle LTE/LTE-A communications in the second spectrum. The UE wireless communication management module 1660, or portions of it, may include a processor, and/or some or all of the functions of the UE wireless communication management module 1660 may be performed by the UE processor module 1610 and/or in connection with the UE processor module 1610. In some examples, the UE wireless communication management module 1660 may be an example of the wireless communication management module 1120 and/or 1220 described with reference to FIG. 11 and/or 12.

Figure 17:
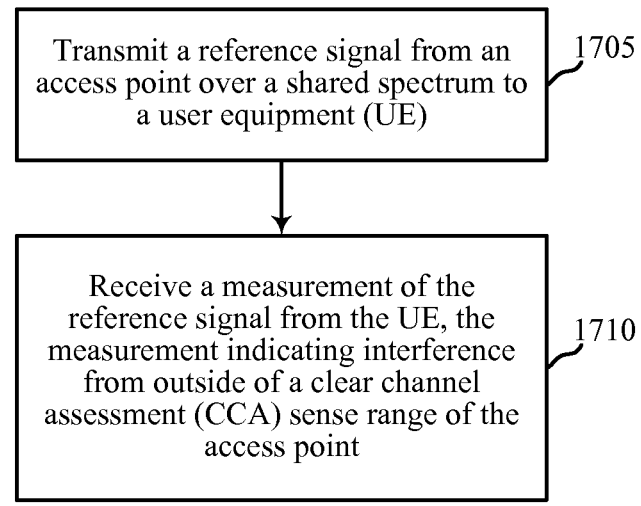
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the access points 105, 205, 205-a, 305-a, 305-b, 305-c, 305-d, 405, 505, and/or base station 1505 described with reference to FIG. 1, 2, 3, 4, 5, and/or 15, and/or aspects of one or more of the apparatuses 905 and/or 1005 described with reference to FIG. 9 and/or 10. In some examples, an access point and/or apparatus may execute one or more sets of codes to control the functional elements of the access point and/or apparatus to perform the functions described below.

At block 1705, the method 1700 may include transmitting a reference signal from an access point over a shared spectrum to a UE. The shared spectrum may be a radio frequency spectrum for which apparatuses may need to contend for access because the radio frequency spectrum is available, at least in part, for unlicensed use (e.g., Wi-Fi use and/or unlicensed LTE/LTE-A use). The access point may in some examples be an LTE/LTE-A base station. The operation(s) at block 1705 may be performed using the wireless communication management module 920, 1020, and/or 1560 described with reference to FIG. 9, 10, and/or 15, and/or the reference signal transmission module 935 and/or 1065 described with reference to FIG. 9 and/or 10.

At block 1710, the method 1700 may include receiving a measurement of the reference signal from the UE. The measurement may indicate interference with the shared spectrum from outside of a CS range of the access point (see, e.g., the CS range described with reference to FIG. 4 and/or 5). The operation(s) at block 1710 may be performed using the wireless communication management module 920, 1020, and/or 1560 described with reference to FIG. 9, 10, and/or 15, and/or the measurement reception module 940 and/or 1070 described with reference to FIG. 9 and/or 10.

Thus, the method 1700 may provide for wireless communication. It should be noted that the method 1700 is just one implementation and that the operations of the method 1700 may be rearranged or otherwise modified such that other implementations are possible.

Figure 18:
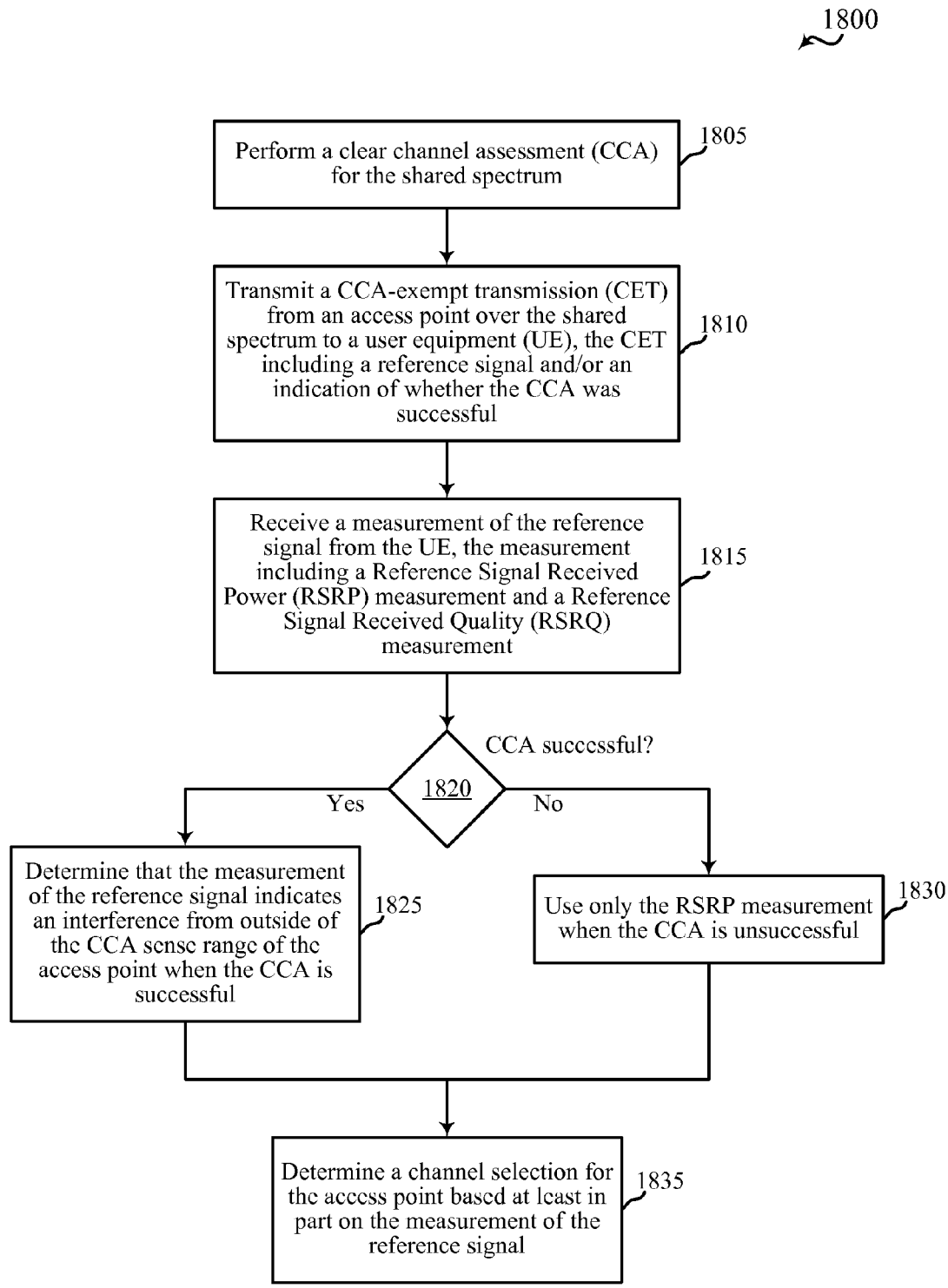
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the access points 105, 205, 205-a, 305-a, 305-b, 305-c, 305-d, 405, 505, and/or 1505 described with reference to FIG. 1, 2, 3, 4, 5, and/or 15, and/or aspects of one or more of the apparatuses 905 and/or 1005 described with reference to FIG. 9 and/or 10. In some examples, an access point and/or apparatus may execute one or more sets of codes to control the functional elements of the access point and/or apparatus to perform the functions described below.

At block 1805, the method 1800 may include performing a CCA for a shared spectrum. The shared spectrum may be a radio frequency spectrum for which apparatuses may need to contend for access because the radio frequency spectrum is available, at least in part, for unlicensed use (e.g., Wi-Fi use and/or unlicensed LTE/LTE-A use). The CCA may be performed for an access point, to determine whether the shared spectrum is available to the access point. The access point may in some examples be an LTE/LTE-A base station. The operation(s) at block 1805 may be performed using the wireless communication management module 920, 1020, and/or 1560 described with reference to FIG. 9, 10, and/or 15, and/or the CCA module 1050 described with reference to FIG. 10.

At block 1810, the method 1800 may include transmitting a CET from the access point over the shared spectrum to a UE. The CET may include a reference signal and/or an indication of whether the CCA was successful (see, e.g., the CET described with reference to FIG. 6 and/or 7). The CET may be transmitted immediately (or very soon after) performing the CCA. In this manner, the reference signal included in the CET (which CET may be sent regardless of whether the CCA was successful) may be made LBT compliant when the CCA is successful (e.g., when the CCA is successful, the CET may be assumed to be transmitted when interference with the shared spectrum from inside a CS range of the access point is below a threshold), and the reference signal may be measured for the purpose of determining an interference with the shared spectrum from outside the CS range of the access point. In some examples, the indication of whether the CCA was successful may be encoded in a single bit indicating that the shared spectrum was CLEAR or BUSY. The operation(s) at block 1810 may be performed using the wireless communication management module 920, 1020, and/or 1560 described with reference to FIG. 9, 10, and/or 15, the reference signal transmission module 935 and/or 1065 described with reference to FIG. 9 and/or 10, and/or the CET transmission module 1060 described with reference to FIG. 10.

At block 1815, the method 1800 may include receiving a measurement of the reference signal from the UE. The measurement may in some examples include an RSRP measurement and/or an RSRQ measurement. The operation(s) at block 1815 may be performed using the wireless communication management module 920, 1020, and/or 1560 described with reference to FIG. 9, 10, and/or 15, and/or the measurement reception module 1070 described with reference to FIG. 9 and/or 10.

At block 1820, the method 1800 may include determining whether the CCA performed at block 1805 was successful.

When it is determined that the CCA was successful, the method 1800 may proceed to block 1825. When it is determined that the CCA was not successful, the method 1800 may proceed to block 1830.

At block 1825, the method 1800 may include determining that the measurement of the reference signal indicates an interference with the shared spectrum from outside the CS range of the access point when the CCA is successful (see, e.g., the CS range described with reference to FIG. 4 and/or 5).

At block 1830, the method 1800 may include using only the RSRP measurement when the CCA is not successful.

The operation(s) at block 1820, block 1825, and/or block 1830 may be performed using the wireless communication management module 920, 1020, and/or 1560 described with reference to FIG. 9, 10, and/or 15, the measurement reception module 940 and/or 1070 described with reference to FIG. 9 and/or 10, and/or the measurement analysis module 1075 described with reference to FIG. 10.

At block 1835, the method 1800 may include determining a channel selection for the access point based at least in part on the measurement of the reference signal. The operation(s) at block 1835 may be performed using the wireless communication management module 920, 1020, and/or 1560 described with reference to FIG. 9, 10, and/or 15, and/or the channel selection module 1085 described with reference to FIG. 10.

Thus, the method 1800 may provide for wireless communication. It should be noted that the method 1800 is just one implementation and that the operations of the method 1800 may be rearranged or otherwise modified such that other implementations are possible.

Figure 19:
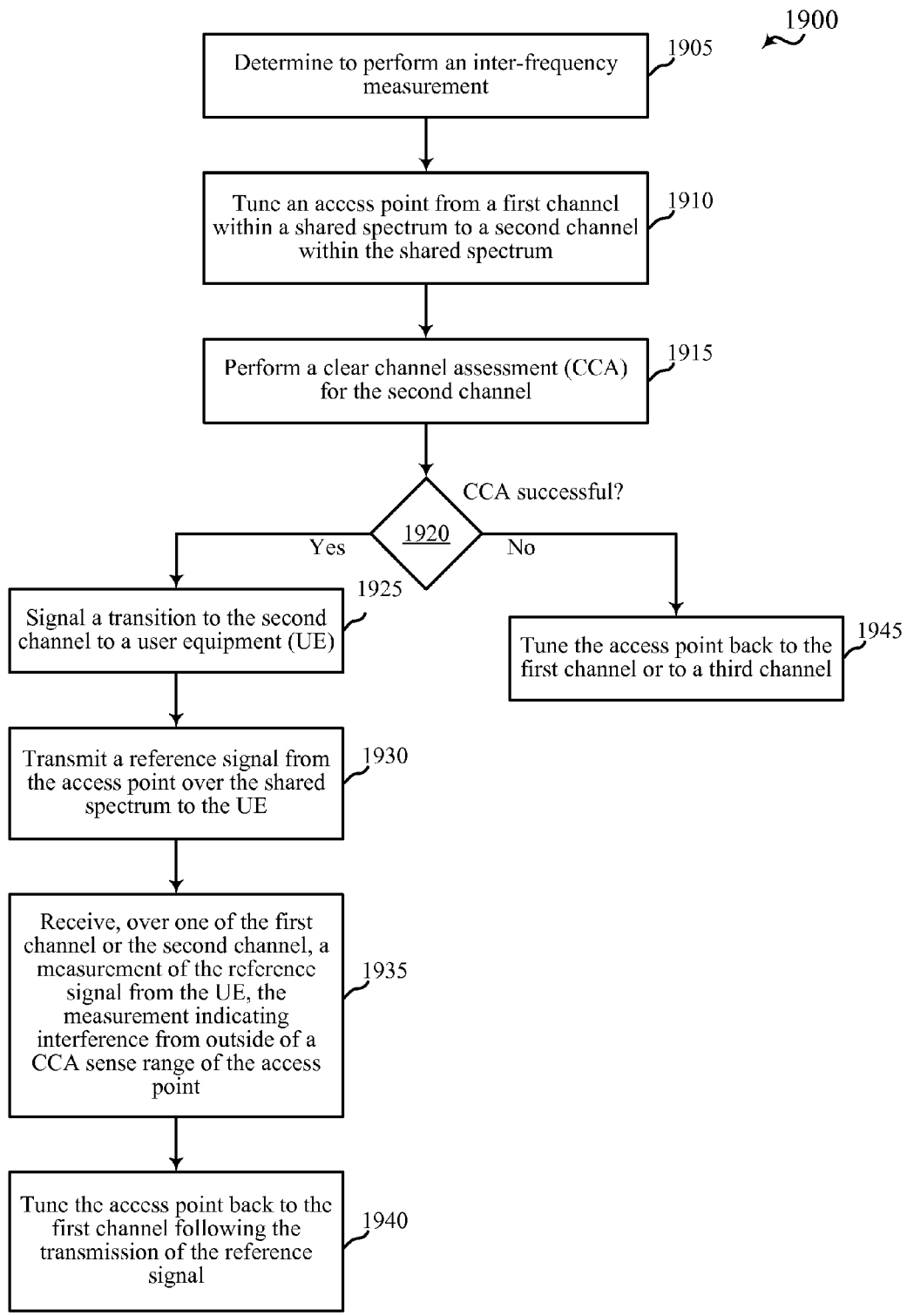
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the access points 105, 205, 205-*a*, 305-*a*, 305-*b*, 305-*c*, 305-*d*, 405, 505, and/or 1505 described with reference to FIG. 1, 2, 3, 4, 5, and/or 15, and/or aspects of one or more of the apparatuses 905 and/or 1005 described with reference to FIG. 9 and/or 10. In some examples, an access point and/or apparatus may execute one or more sets of codes to control the functional elements of the access point and/or apparatus to perform the functions described below.

At block 1905, the method 1900 may include determining to perform an inter-frequency measurement. The operation(s) at block 1905 may be performed using the wireless communication management module 920, 1020, and/or 1560 described with reference to FIG. 9, 10, and/or 15, and/or the measurement acquisition module 1035 described with reference to FIG. 10.

At block 1910, the method 1900 may include tuning an access point from a first channel within a shared spectrum to a second channel within the shared spectrum. The shared spectrum may be a radio frequency spectrum for which apparatuses may need to contend for access because the radio frequency spectrum is available, at least in part, for unlicensed use (e.g., Wi-Fi use and/or unlicensed LTE/LTE-A use). The access point may in some examples be an LTE/LTE-A base station. The operation(s) at block 1910 may be performed using the wireless communication management module 920, 1020, and/or 1560 described with reference to FIG. 9, 10, and/or 15, and/or the frequency tuning module 1040 described with reference to FIG. 10.

At block 1915, the method 1900 may include performing a CCA for the shared spectrum. The CCA may be performed for the access point, to determine whether the shared spectrum is available to the access point. The operation(s) at block 1915 may be performed using the wireless communication management module 920, 1020, and/or 1560 described with reference to FIG. 9, 10, and/or 15, and/or the CCA module 1050 described with reference to FIG. 10.

At block 1920, the method 1900 may include determining whether the CCA performed at block 1915 was successful. When it is determined that the CCA was successful, the method 1900 may proceed to block 1925. When it is determined that the CCA was not successful, the method 1900 may proceed to block 1945. The operation(s) at block 1920 may be performed using the wireless communication management module 920, 1020, and/or 1560 described with reference to FIG. 9, 10, and/or 15, and/or the CCA frame transmission module 1055 described with reference to FIG. 9 and/or 10.

At block 1925, the method 1900 may include signaling a transition to the second channel to the UE prior to transmitting the reference signal over the second channel. The signaling may also indicate a need for the UE to perform a reference signal measurement during a transmission of a CCA frame. The operation(s) at block 1925 may be performed using the wireless communication management module 920, 1020, and/or 1560 described with reference to FIG. 9, 10, and/or 15, the reference signal transmission module 935 and/or 1065 described with reference to FIG. 9 and/or 10, and/or the UE signaling module 1045 described with reference to FIG. 10.

At block 1930, and when the CCA performed at block 1915 was successful, the method 1900 may include transmitting a reference signal (e.g., a CRS type of reference signal) from the access point over the shared spectrum to a UE. The reference signal may be transmitted in a CCA frame for which the successful CCA was performed (e.g., see the CCA frame described with reference to FIG. 8). In some examples, the CCA frame may contain one or more reference signals but no data. The operation(s) at block 1930 may be performed using the wireless communication management module 920, 1020, and/or 1560 described with reference to FIG. 9, 10, and/or 15, the reference signal transmission module 935 and/or 1065 described with reference to FIG. 9 and/or 10, and/or the CCA frame transmission module 1055 described with reference to FIG. 10.

At block 1935, the method 1900 may include receiving, over one of the first channel and the second channel, a measurement of the reference signal from the UE. The measurement may indicate interference with the shared spectrum from outside of a CS range of the access point (see, e.g., the CCA range described with reference to FIG. 4 and/or 5). The measurement may in some examples include an RSRP measurement and/or an RSRQ measurement. The operation(s) at block 1935 may be performed using the wireless communication management module 920, 1020, and/or 1560 described with reference to FIG. 9, 10, and/or 15, and/or the measurement reception module 940 and/or 1070 described with reference to FIG. 9 and/or 10.

At block 1940, the method 1900 may include tuning the access point back to the first channel following the transmission of the reference signal. The operation(s) at block 1940 may be performed using the wireless communication management module 920, 1020, and/or 1560 described with reference to FIG. 9, 10, and/or 15, and/or the frequency tuning module 1040 described with reference to FIG. 10. In some examples, the operation(s) at block 1940 may be performed before the operation(s) performed at block 1930.

At block 1945, the method 1900 may include tuning the access point back to the first channel or to a third channel when the CCA performed at block 1915 is not successful. The operation(s) at block 1945 may be performed using the wireless communication management module 920, 1020, and/or 1560 described with reference to FIG. 9, 10, and/or 15, and/or the frequency tuning module 1040 described with reference to FIG. 10.

Thus, the method 1900 may provide for wireless communication. It should be noted that the method 1900 is just one implementation and that the operations of the method 1900 may be rearranged or otherwise modified such that other implementations are possible.

Figure 20:
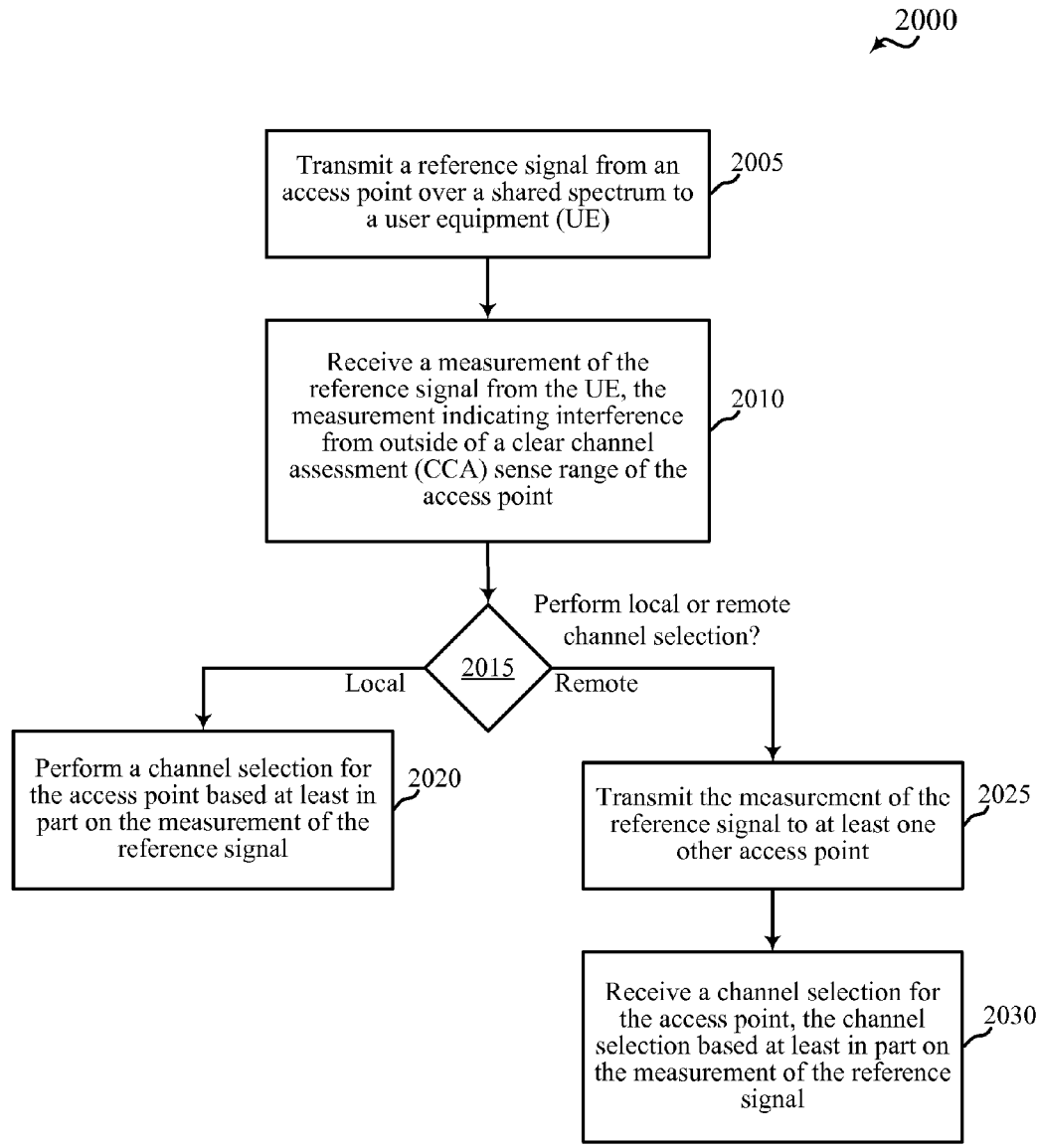
FIG. 20 is a flow chart illustrating an example of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the access points 105, 205, 205-a, 305-a, 305-b, 305-c, 305-d, 405, 505, and/or 1505 described with reference to FIG. 1, 2, 3, 4, 5, and/or 15, and/or aspects of one or more of the apparatuses 905 and/or 1005 described with reference to FIG. 9 and/or 10. In some examples, an access point and/or apparatus may execute one or more sets of codes to control the functional elements of the access point and/or apparatus to perform the functions described below.

At block 2005, the method 2000 may include transmitting a reference signal from an access point over a shared spectrum to a UE. The shared spectrum may be a radio frequency spectrum for which apparatuses may need to contend for access because the radio frequency spectrum is available, at least in part, for unlicensed use (e.g., Wi-Fi use and/or unlicensed LTE/LTE-A use). The access point may in some examples be an LTE/LTE-A base station. The operation(s) at block 2005 may be performed using the wireless communication management module 920, 1020, and/or 1560 described with reference to FIG. 9, 10, and/or 15, and/or the reference signal transmission module 935 and/or 1065 described with reference to FIG. 9 and/or 10.

At block 2010, the method 2000 may include receiving a measurement of the reference signal from the UE. The measurement may indicate interference with the shared spectrum from outside of a CS range of the access point (see, e.g., the CS range described with reference to FIG. 4 and/or 5). The operation(s) at block 2010 may be performed using the wireless communication management module 920, 1020, and/or 1560 described with reference to FIG. 9, 10, and/or 15, and/or the measurement reception module 940 and/or 1070 described with reference to FIG. 9 and/or 10.

At block 2015, the method 2000 may include determining whether a local channel selection or a remote channel selection is to be performed for the access point. When it is determined that a local channel selection is to be performed, the method 2000 may proceed to block 2020. When it is determined that a remote channel selection is to be performed, the method 2000 may proceed to block 2025. The operation(s) at block 2015 may be performed using the wireless communication management module 920, 1020, and/or 1560 described with reference to FIG. 9, 10, and/or 15, and/or the channel selection module 1085 described with reference to FIG. 10.

At block 2020, the method 2000 may include performing a channel selection for the access point based at least in part on the measurement of the reference signal. The operation(s) at block 2020 may be performed using the wireless communication management module 920, 1020, and/or 1560 described with reference to FIG. 9, 10, and/or 15, and/or the channel selection module 1085 described with reference to FIG. 10.

At block 2025, the method 2000 may include transmitting the measurement of the reference signal to at least one other access point. The measurement of the reference signal may in some examples be transmitted to the at least one other access point over a backhaul interface. The operation(s) at block 2025 may be performed using the wireless communication management module 920, 1020, and/or 1560 described with reference to FIG. 9, 10, and/or 15, and/or the measurement transmission module 1080 described with reference to FIG. 10.

At block 2030, the method 2000 may include receiving a channel selection for the access point. The channel selection may be based at least in part on the measurement of the reference signal. The channel selection may in some examples be received over a backhaul interface. The operation(s) at block 2030 may be performed using the wireless communication management module 920, 1020, and/or 1560 described with reference to FIG. 9, 10, and/or 15, and/or the channel selection module 1085 described with reference to FIG. 10.

Thus, the method 2000 may provide for wireless communication. It should be noted that the method 2000 is just one implementation and that the operations of the method 2000 may be rearranged or otherwise modified such that other implementations are possible.

In some examples, aspects of one or more of the methods 1700, 1800, 1900, and/or 2000 may be combined.

Figure 21:
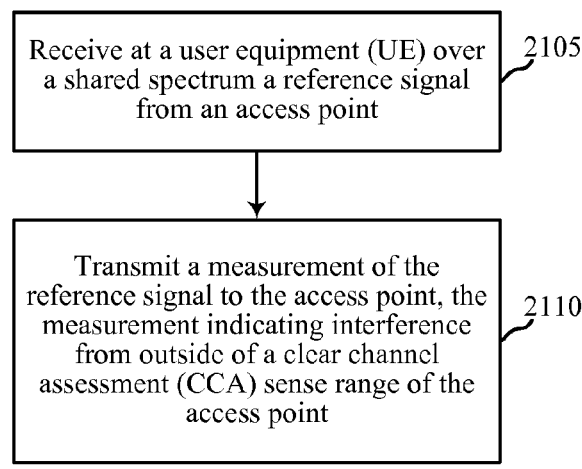
FIG. 21 is a flow chart illustrating an example of a method for wireless communication, in accordance with various aspects of the present disclosure.

FIG. 21 is a flow chart illustrating an example of a method 2100 for wireless communication, in accordance with various aspects of the present disclosure. For clarity, the method 2100 is described below with reference to aspects of one or more of the UEs 115, 215, 215-a, 215-b, 215-c, 315, 415, 515, and/or 1615 described with reference to FIG. 1, 2, 3, 4, 5, and/or 16, and/or aspects of one or more of the apparatuses 1115 and/or 1215 described with reference to FIG. 11 and/or 12. In some examples, a UE and/or apparatus may execute one or more sets of codes to control the functional elements of the UE and/or apparatus to perform the functions described below.

At block 2105, the method 2100 may include receiving at a UE over a shared spectrum a reference signal from an access point. The shared spectrum may be a radio frequency spectrum for which apparatuses may need to contend for access because the radio frequency spectrum is available, at least in part, for unlicensed use (e.g., Wi-Fi use and/or unlicensed LTE/LTE-A use). The access point may in some examples be an LTE/LTE-A base station. The operation(s) at block 2105 may be performed using the wireless communication management module 1120, 1220, and/or 1660 described with reference to FIG. 11, 12, and/or 16, and/or the reference signal reception module 1135 and/or 1255 described with reference to FIG. 11 and/or 12.

At block 2110, the method 2100 may include transmitting a measurement of the reference signal to the access point. The measurement may indicate interference with the shared spectrum from outside of a CS range of the access point (see, e.g., the CS range described with reference to FIG. 4 and/or 5). The operation(s) at block 2110 may be performed using the wireless communication management module 1120, 1220, and/or 1660 described with reference to FIG. 11, 12, and/or 16, and/or the measurement transmission module 1140 and/or 1270 described with reference to FIG. 11 and/or 12.

Thus, the method 2100 may provide for wireless communication. It should be noted that the method 2100 is just one implementation and that the operations of the method 2100 may be rearranged or otherwise modified such that other implementations are possible.

Figure 22:
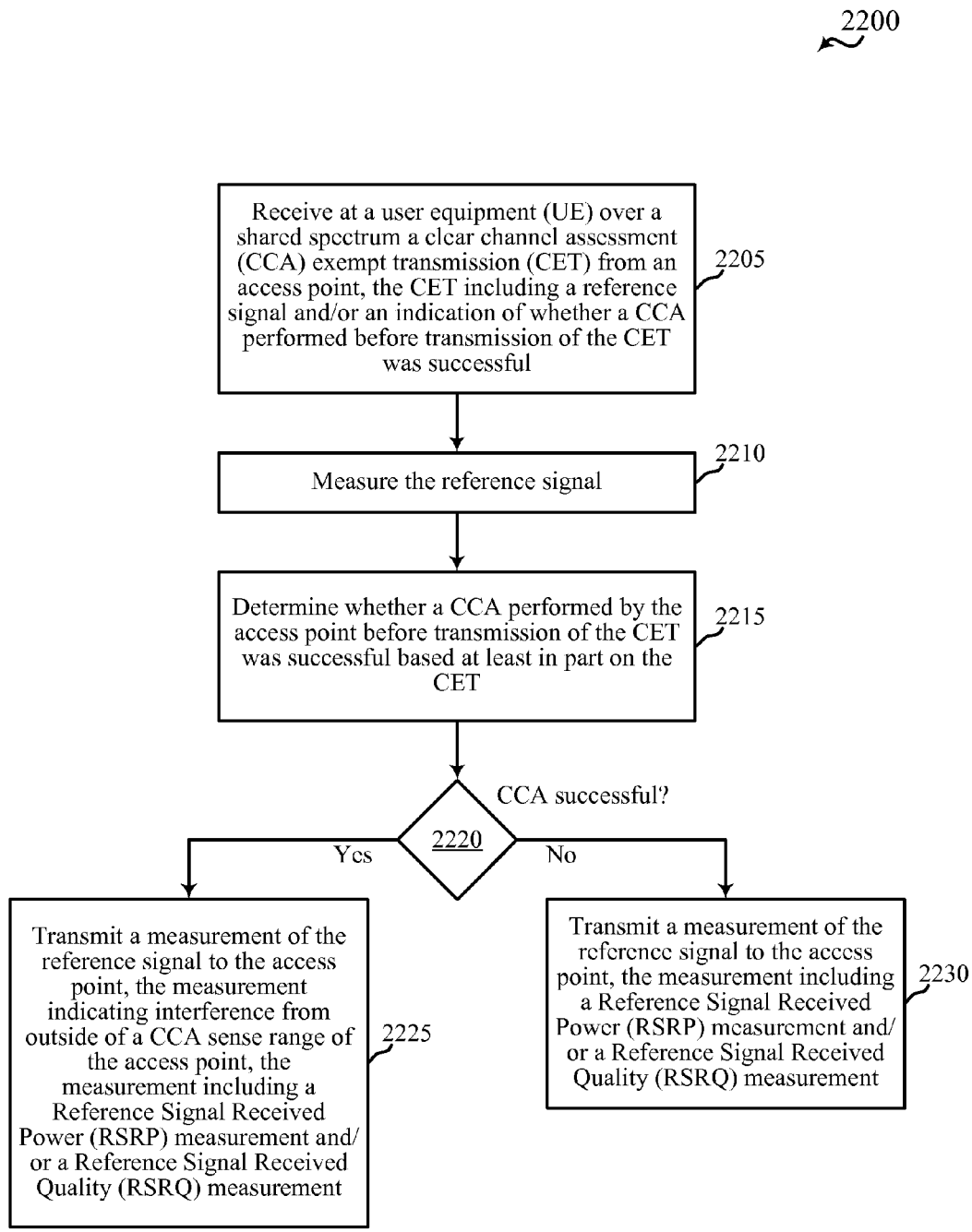
FIG. 22 is a flow chart illustrating an example of a method for wireless communication, in accordance with various aspects of the present disclosure.

FIG. 22 is a flow chart illustrating an example of a method 2200 for wireless communication, in accordance with various aspects of the present disclosure. For clarity, the method 2200 is described below with reference to aspects of one or more of the UEs 115, 215, 215-a, 215-b, 215-c, 315, 415, 515, and/or 1615 described with reference to FIG. 1, 2, 3, 4, 5, and/or 16, and/or aspects of one or more of the apparatuses 1115 and/or 1215 described with reference to FIG. 11 and/or 12. In some examples, a UE and/or apparatus may execute one or more sets of codes to control the functional elements of the UE and/or apparatus to perform the functions described below.

At block 2205, the method 2200 may include receiving at a UE over a shared spectrum a CET from an access point. The CET may include a reference signal and/or an indication of whether a CCA performed by the access point before transmission of the CET was successful (see, e.g., the CET described with reference to FIG. 6 and/or 7). The shared spectrum may be a radio frequency spectrum for which apparatuses may need to contend for access because the radio frequency spectrum is available, at least in part, for unlicensed use (e.g., Wi-Fi use and/or unlicensed LTE/LTE-A use). The access point may in some examples be an LTE/LTE-A base station. The operation(s) at block 2205 may be performed using the wireless communication management module 1120, 1220, and/or 1660 described with reference to FIG. 11, 12, and/or 16, and/or the reference signal reception module 1135 and/or 1255, and/or the CET reception module 1250 described with reference to FIG. 11 and/or 12.

At block 2210, the method 2200 may include measuring the reference signal to produce a measurement of the reference signal. The measurement may in some examples include an RSRP measurement and/or an RSRQ measurement. The operation(s) at block 2210 may be performed using the wireless communication management module 1120, 1220, and/or 1660 described with reference to FIG. 11, 12, and/or 16, and/or the measurement module 1265 described with reference to FIG. 12.

At block 2215, the method 2200 may include determining whether the CCA performed by the access point before transmission of the CET was successful. The determination may be based at least in part on the CET. When it is determined that the CCA was successful, the method 2200 may proceed to block 2225. When it is determined that the CCA was not successful, the method 2200 may proceed to block 2230. In some examples, it may be determined whether the CCA was successful by determining the state of a single bit. The operation(s) at block 2220, block 2225, and/or block 2230 may be performed using the wireless communication management module 1120, 1220, and/or 1660 described with reference to FIG. 11, 12, and/or 16, and/or the CCA analysis module 1260 described with reference to FIG. 12.

At block 2225, the method 2200 may include transmitting the measurement of the reference signal to the access point. The measurement may indicate interference with the shared spectrum from outside of a CS range of the access point (see, e.g., the CS range described with reference to FIG. 4 and/or 5). The measurement may in some examples include an RSRP measurement and/or an RSRQ measurement. The operation(s) at block 2225 may be performed using the wireless communication management module 1120, 1220, and/or 1660 described with reference to FIG. 11, 12, and/or 16, and/or the measurement transmission module 1140 and/or 1270 described with reference to FIG. 11 and/or 12.

At block 2230, the method 2200 may include transmitting the measurement of the reference signal to the access point. Because the CCA performed by the access point before transmission of the CET was not successful, only a transmitted RSRP measurement may be useful. The operation(s) at block 2230 may be performed using the wireless communication management module 1120, 1220, and/or 1660 described with reference to FIG. 11, 12, and/or 16, and/or the measurement transmission module 1140 and/or 1270 described with reference to FIG. 11 and/or 12.

Thus, the method 2200 may provide for wireless communication. It should be noted that the method 2200 is just one implementation and that the operations of the method 2200 may be rearranged or otherwise modified such that other implementations are possible.

Figure 23:
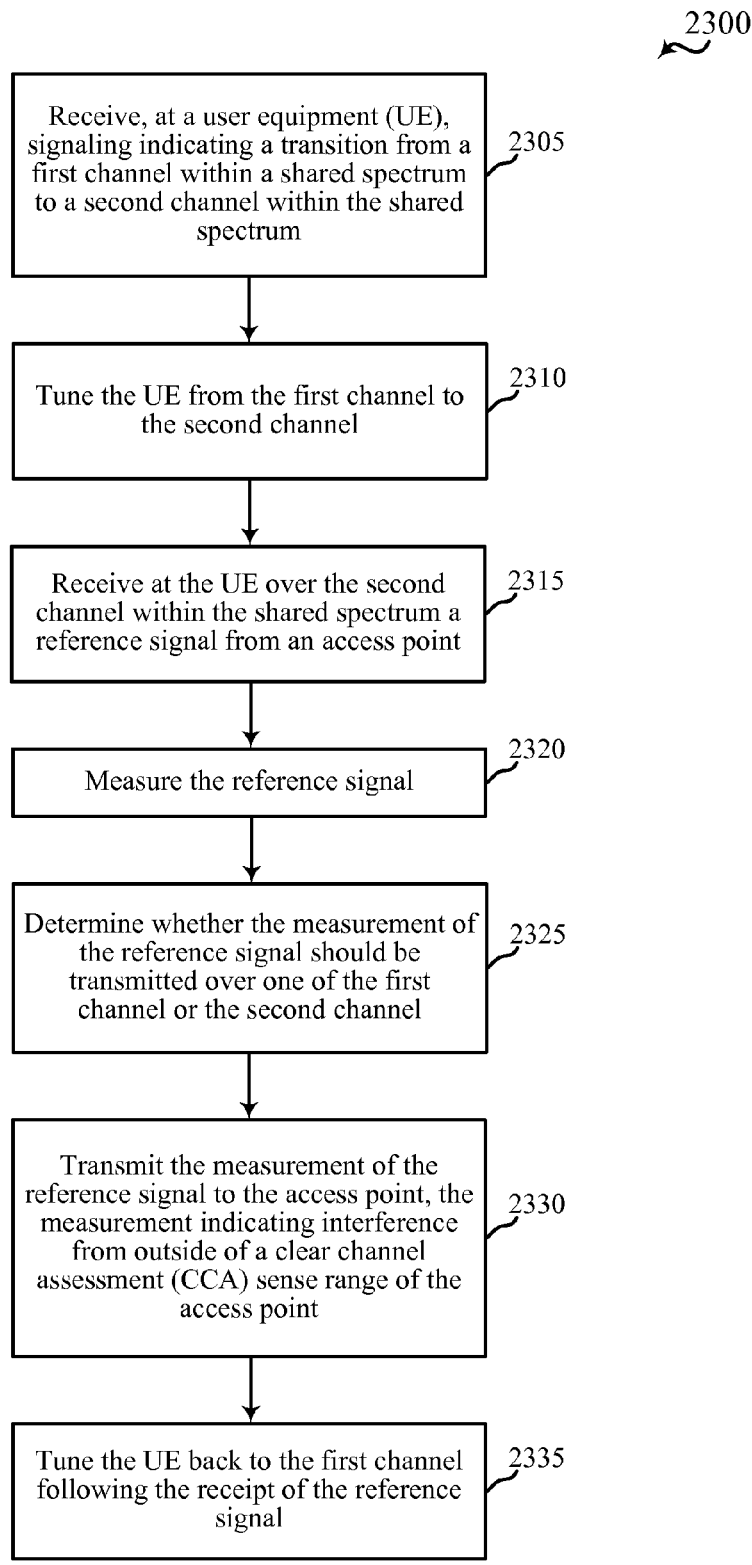
FIG. 23 is a flow chart illustrating an example of a method for wireless communication, in accordance with various aspects of the present disclosure.

FIG. 23 is a flow chart illustrating an example of a method 2300 for wireless communication, in accordance with various aspects of the present disclosure. For clarity, the method 2300 is described below with reference to aspects of one or more of the UEs 115, 215, 215-a, 215-b, 215-c, 315, 415, 515, and/or 1615 described with reference to FIG. 1, 2, 3, 4, 5, and/or 16, and/or aspects of one or more of the apparatuses 1115 and/or 1215 described with reference to FIG. 11 and/or 12. In some examples, a UE and/or apparatus may execute one or more sets of codes to control the functional elements of the UE and/or apparatus to perform the functions described below.

At block 2305, the method 2300 may include receiving, at a UE, signaling indicating a transition from a first channel within a shared spectrum to a second channel within the shared spectrum. The signaling may also indicate a need for the UE to perform a reference signal measurement during reception of a CCA frame. The shared spectrum may be a radio frequency spectrum for which apparatuses may need to contend for access because the radio frequency spectrum is available, at least in part, for unlicensed use (e.g., Wi-Fi use and/or unlicensed LTE/LTE-A use). The operation(s) at block 2305 may be performed using the wireless communication management module 1120, 1220, and/or 1660 described with reference to FIG. 11, 12, and/or 16, and/or the signaling reception module 1235 described with reference to FIG. 12.

At block 2310, the method 2300 may include tuning the UE from the first channel within the shared spectrum to the second channel within the shared spectrum. In some examples, the tuning of the UE to the second channel may occur in response to the signaling. The operation(s) at block 2310 may be performed using the wireless communication management module 1120, 1220, and/or 1660 described with reference to FIG. 11, 12, and/or 16, and/or the frequency tuning module 1240 described with reference to FIG. 12.

At block 2315, the method 2300 may include receiving at the UE over the shared spectrum a reference signal (e.g., a CRS type of reference signal) from an access point. The reference signal may be received in a CCA frame for which a successful CCA was performed by the access point (e.g., see the CCA frame described with reference to FIG. 8). The access point may in some examples be an LTE/LTE-A base station. The operation(s) at block 2315 may be performed using the wireless communication management module 1120, 1220, and/or 1660 described with reference to FIG. 11, 12, and/or 16, and/or the reference signal reception module 1135 and/or 1255 described with reference to FIG. 11 and/or 12.

At block 2320, the method 2300 may include measuring the reference signal to produce a measurement of the reference signal. The measurement may in some examples include an RSRP measurement and/or an RSRQ measurement. The operation(s) at block 2320 may be performed using the wireless communication management module 1120, 1220, and/or 1660 described with reference to FIG. 11, 12, and/or 16, and/or the measurement module 1265 described with reference to FIG. 12.

At block 2325, the method 2300 may include determining whether the measurement of the reference signal should be transmitted over one of the first channel or the second channel. The operation(s) at block 2325 may be performed using the wireless communication management module 1120, 1220, and/or 1660 described with reference to FIG. 11, 12, and/or 16, and/or the measurement transmission module 1270 described with reference to FIG. 12.

At block 2330, the method 2300 may include transmitting the measurement of the reference signal to the access point. The measurement may indicate interference with the shared spectrum from outside of a CS range of the access point (see, e.g., the CS range described with reference to FIG. 4 and/or 5). The operation(s) at block 2330 may be performed using the wireless communication management module 1120, 1220, and/or 1660 described with reference to FIG. 11, 12, and/or 16, and/or the measurement transmission module 1140 and/or 1270 described with reference to FIG. 11 and/or 12.

At block 2335, the method 2300 may include tuning the UE back to the first channel following receipt of the reference signal. The operation(s) at block 2335 may be performed using the wireless communication management module 1120, 1220, and/or 1660 described with reference to FIG. 11, 12, and/or 16, and/or the frequency tuning module 1240 described with reference to FIG. 12.

Thus, the method 2300 may provide for wireless communication. It should be noted that the method 2300 is just one implementation and that the operations of the method 2300 may be rearranged or otherwise modified such that other implementations are possible.

In some examples, aspects of one or more of the methods 2100, 2200, and/or 2300 may be combined.

Figure 24:
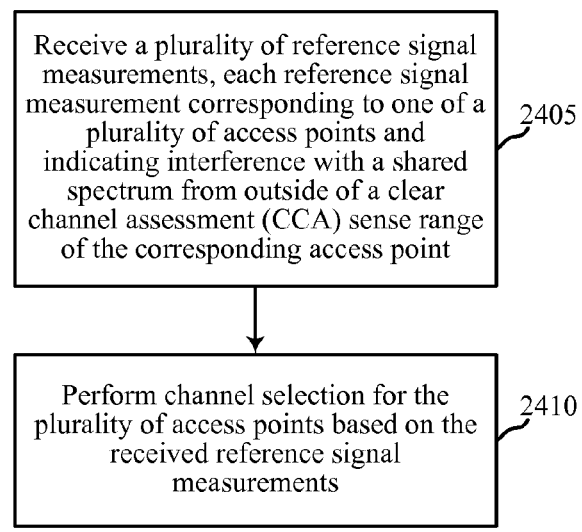
FIG. 24 is a flow chart illustrating an example of a method for wireless communication, in accordance with various aspects of the present disclosure.

FIG. 24 is a flow chart illustrating an example of a method 2400 for wireless communication, in accordance with various aspects of the present disclosure. For clarity, the method 2400 is described below with reference to aspects of the core network 130 and/or 1545 described with reference to FIG. 1 and/or 15, and/or aspects of one or more of the apparatuses 1305 and/or 1405 described with reference to FIG. 13 and/or 14. In some examples, a core network and/or apparatus may execute one or more sets of codes to control the functional elements of the core network and/or apparatus to perform the functions described below.

At block 2405, the method 2400 may include receiving a plurality of reference signal measurements. Each reference signal measurement may correspond to one of a plurality of access points and may indicate interference with a shared spectrum from outside of a CS range of the corresponding access point (see, e.g., the CS range described with reference to FIG. 4 and/or 5). The shared spectrum may be a radio frequency spectrum for which apparatuses may need to contend for access because the radio frequency spectrum is available, at least in part, for unlicensed use (e.g., Wi-Fi use and/or unlicensed LTE/LTE-A use). In some examples, at least one of the access points may be an LTE/LTE-A base station. In some examples, at least a portion of the plurality of reference signal measurements may be received over a backhaul interface. The operation(s) at block 2405 may be performed using the wireless communication management module 1320 and/or 1420 described with reference to FIG. 13 and/or 14, and/or the reference signal reception module 1335 and/or 1435 described with reference to FIG. 13 and/or 14.

At block 2410, the method 2400 may include performing channel selection for the plurality of access points based at least in part on the received reference signal measurements. The operation(s) at block 2410 may be performed using the wireless communication management module 1320 and/or 1420 described with reference to FIG. 13 and/or 14, and/or the channel selection module 1340 and/or 1450 described with reference to FIG. 13 and/or 14.

Thus, the method 2400 may provide for wireless communication. It should be noted that the method 2400 is just one implementation and that the operations of the method 2400 may be rearranged or otherwise modified such that other implementations are possible.

Figure 25:
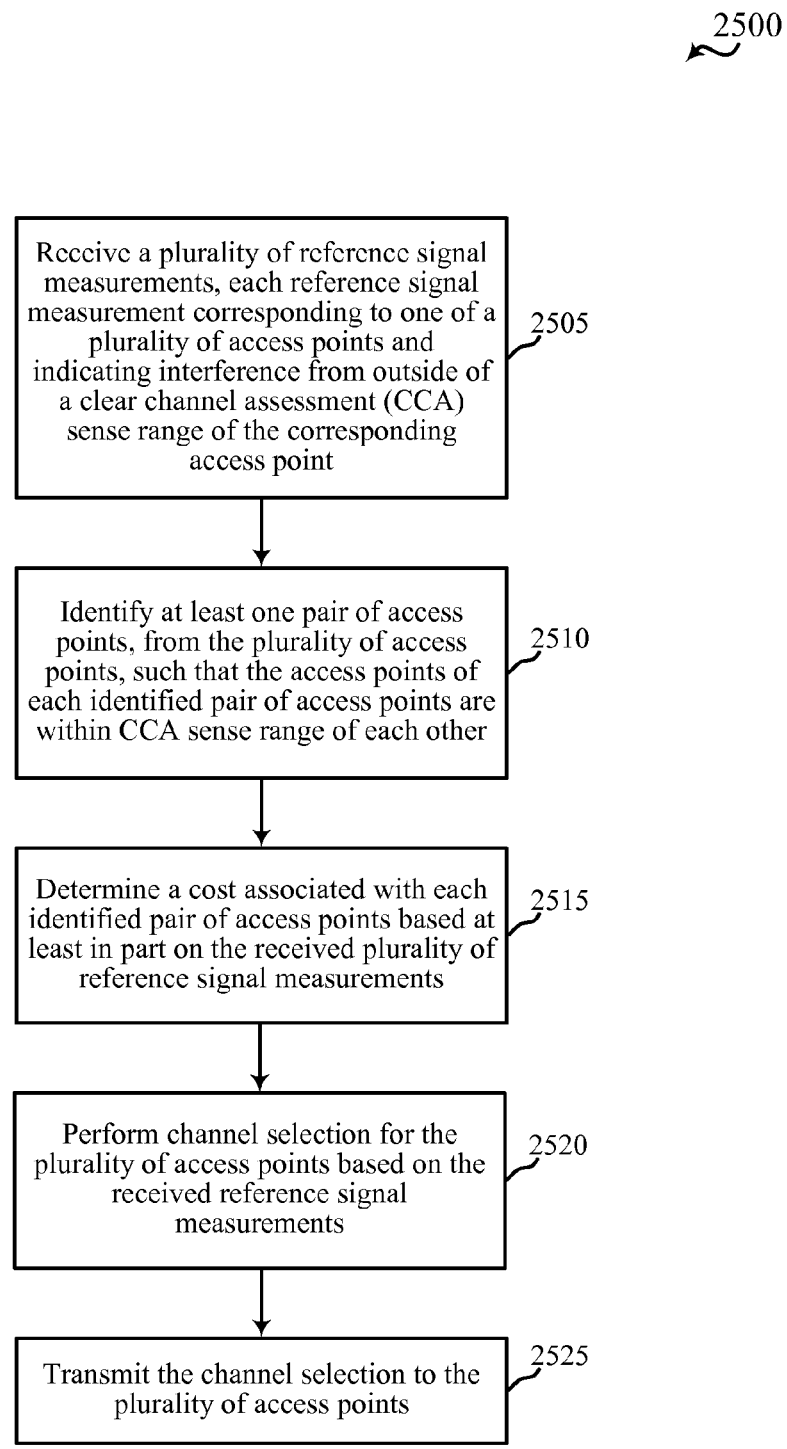
FIG. 25 is a flow chart illustrating an example of a method for wireless communication, in accordance with various aspects of the present disclosure.

FIG. 25 is a flow chart illustrating an example of a method 2500 for wireless communication, in accordance with various aspects of the present disclosure. For clarity, the method 2500 is described below with reference to aspects of the core network 130 and/or 1545 described with reference to FIG. 1 and/or 15, and/or aspects of one or more of the apparatuses 1325 and/or 1425 described with reference to FIG. 13 and/or 14. In some examples, a core network and/or apparatus may execute one or more sets of codes to control the functional elements of the core network and/or apparatus to perform the functions described below.

At block 2505, the method 2500 may include receiving a plurality of reference signal measurements. Each reference signal measurement may correspond to one of a plurality of access points and may indicate interference with a shared spectrum from outside of a CS range of the corresponding access point (see, e.g., the CS range described with reference to FIG. 4 and/or 5). The shared spectrum may be a radio frequency spectrum for which apparatuses may need to contend for access because the radio frequency spectrum is available, at least in part, for unlicensed use (e.g., Wi-Fi use and/or unlicensed LTE/LTE-A use). In some examples, at least one of the access points may be an LTE/LTE-A base station. In some examples, at least a portion of the plurality of reference signal measurements may be received over a backhaul interface. The operation(s) at block 2505 may be performed using the wireless communication management module 1320 and/or 1420 described with reference to FIG. 13 and/or 14, and/or the reference signal reception module 1335 and/or 1435 described with reference to FIG. 13 and/or 14.

At block 2510, the method 2500 may include identifying at least one pair of access points, from the plurality of access points, such that the access points of each identified pair of access points are within CS range of each other. In some examples, at least one pair of access points may be identified such that the MAC scheme associated with the at least one pair of access points includes one of Frequency Re-use 1 or time domain multiplexing. The operation(s) at block 2510 may be performed using the wireless communication management module 1320 and/or 1420 described with reference to FIG. 13 and/or 14, and/or the access point pair identification module 1440 described with reference to FIG. 14.

At block 2515, the method 2500 may include determining a cost associated with each identified pair of access points based at least in part on the received plurality of reference signal measurements. The operation(s) at block 2515 may be performed using the wireless communication management module 1320 and/or 1420 described with reference to FIG. 13 and/or 14, and/or the cost determination module 1445 described with reference to FIG. 14.

In some examples of the method 2500, the cost associated with each identified pair of access points may be further based at least in part on whether the access points of the pair of access points currently operate on the same channel. In some examples of the method 2500, the cost associated with each identified pair of access points may be further based at least in part on a MAC scheme associated with the pair of access points. In some examples of the method 2500, the cost associated with each identified pair of access points may be further based at least in part on whether one or more access points of the pair of access points operate within a dynamic frequency scaling or radar channel.

At block 2520, the method 2500 may include performing channel selection for the plurality of access points based at least in part on the received reference signal measurements. In some examples, performing channel selection for the plurality of access points may include selecting a channel for each of the access points that minimizes an aggregate cost associated with the identified at least one pair of access points. The operation(s) at block 2520 may be performed using the wireless communication management module 1320 and/or 1420 described with reference to FIG. 13 and/or 14, and/or the channel selection module 1340 and/or 1450 described with reference to FIG. 13 and/or 14.

At block 2525, the method 2500 may include transmitting the channel selection to the plurality of access points. In some examples, the channel selection may be transmitted over at least one backhaul interface. The operation(s) at block 2525 may be performed using the wireless communication management module 1320 and/or 1420 described with reference to FIG. 13 and/or 14, and/or the channel selection transmission module 1455 described with reference to FIG. 14.

Thus, the method 2500 may provide for wireless communication. It should be noted that the method 2500 is just one implementation and that the operations of the method 2500 may be rearranged or otherwise modified such that other implementations are possible.

In some examples, aspects of one or more of the methods 2400 and/or 2500 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disc ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
performing a clear channel assessment (CCA) for a shared spectrum;
transmitting a CCA-exempt transmission (CET) to a user equipment (UE) over the shared spectrum, wherein the CET comprises a reference signal from an access point to the UE and an indication of whether the CCA was successful; and
receiving a measurement of the reference signal from the UE, the measurement indicating interference with the shared spectrum from outside of a clear channel assessment (CCA) sense range of the access point.

2. The method of claim 1, further comprising:
determining that the measurement of the reference signal indicates the interference with the shared spectrum from outside of the CCA sense (CS) range of the access point when the CCA is successful.

3. The method of claim 1, wherein the measurement of the reference signal comprises a Reference Signal Received Power (RSRP) measurement and a Reference Signal Received Quality (RSRQ) measurement, the method further comprising:
using only the RSRP measurement when the CCA is unsuccessful.

4. The method of claim 1, further comprising:
tuning the access point from a first channel within the shared spectrum to a second channel within the shared spectrum; and
performing a CCA on the second channel.

5. The method of claim 4, wherein transmitting the reference signal comprises:
transmitting the reference signal over the second channel when the CCA is successful.

6. The method of claim 5, further comprising:
signaling a transition to the second channel to the UE prior to transmitting the reference signal over the second channel.

7. The method of claim 5, further comprising:
tuning the access point back to the first channel following the transmission of the reference signal.

8. The method of claim 4, wherein the measurement of the reference signal is received over one of the first channel or the second channel.

9. An apparatus for wireless communication, comprising:
a processor; and
memory coupled to the processor, wherein the processor is configured to:
perform a clear channel assessment (CCA) for a shared spectrum;
transmit a CCA-exempt transmission (CET) to a user equipment (UE) over the shared spectrum, wherein the CET comprises a reference signal from an access point to the UE and an indication of whether the CCA was successful; and
receive a measurement of the reference signal from the UE, the measurement indicating interference with the shared spectrum from outside of a clear channel assessment (CCA) sense range of the access point.

10. The apparatus of claim 9, wherein the processor is configured to:
determine that the measurement of the reference signal indicates the interference with the shared spectrum from outside of the CCA sense (CS) range of the access point when the CCA is successful.

11. The apparatus of claim 9, wherein the processor is configured to:
tune the access point from a first channel within the shared spectrum to a second channel within the shared spectrum; and
perform a CCA on the second channel.

12. The apparatus of claim 11, wherein transmitting the reference signal comprises:
transmitting the reference signal over the second channel when the CCA is successful.

13. The apparatus of claim 12, wherein the processor is configured to:
signal a transition to the second channel to the UE prior to transmitting the reference signal over the second channel.

14. A method of wireless communication, comprising:
receiving at a user equipment (UE) over a shared spectrum a CCA-exempt transmission (CET) from an access point, wherein the CET comprises a reference signal from the access point to the UE and an indication of whether a CCA performed by the access point was successful; and
transmitting a measurement of the reference signal to the access point, the measurement indicating interference with the shared spectrum from outside of a clear channel assessment (CCA) sense range of the access point.

15. The method of claim 14, wherein the measurement of the reference signal indicates the interference within the shared spectrum from outside of the CCA sense (CS) range of the access point when the CCA performed by the access point was successful.

16. The method of claim 14, wherein the measurement of the reference signal comprises a Reference Signal Received Power (RSRP) measurement or a Reference Signal Received Quality (RSRQ) measurement.

17. The method of claim 14, further comprising:
tuning the UE from a first channel within the shared spectrum to a second channel within the shared spectrum; and
receiving the reference signal over the second channel.

18. The method of claim 17, further comprising:
tuning the UE back to the first channel following the receipt of the reference signal.

19. The method of claim 17, wherein the measurement of the reference signal is transmitted over one of the first channel or the second channel.

20. An apparatus for wireless communication, comprising:
a processor; and
memory coupled to the processor, wherein the processor is configured to:
receive at a user equipment (UE) over a shared spectrum a CCA-exempt transmission (CET) from an access point, wherein the CET comprises a reference signal from the access point to the UE and an indication of whether a CCA performed by the access point was successful; and
transmit a measurement of the reference signal to the access point, the measurement indicating interference with the shared spectrum from outside of a clear channel assessment (CCA) sense range of the access point.

21. The apparatus of claim 20, wherein the processor is configured to:
tune the UE from a first channel within the shared spectrum to a second channel within the shared spectrum; and
receive the reference signal over the second channel.

22. The apparatus of claim 21, wherein transmitting the measurement of the reference signal comprises:
transmitting the measurement of the reference signal over one of the first channel or the second channel.

* * * * *